US011004445B2

(12) United States Patent
Feng et al.

(10) Patent No.: US 11,004,445 B2
(45) Date of Patent: May 11, 2021

(54) INFORMATION PROCESSING METHOD, SERVER, TERMINAL, AND INFORMATION PROCESSING SYSTEM

(71) Applicant: Huawei Technologies Co., Ltd., Shenzhen (CN)

(72) Inventors: Yizu Feng, Shenzhen (CN); Bin Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 16/092,419

(22) PCT Filed: May 27, 2017

(86) PCT No.: PCT/CN2017/086316
§ 371 (c)(1),
(2) Date: Oct. 9, 2018

(87) PCT Pub. No.: WO2017/206832
PCT Pub. Date: Dec. 7, 2017

(65) Prior Publication Data
US 2020/0168211 A1 May 28, 2020

(30) Foreign Application Priority Data

May 31, 2016 (CN) .......................... 201610377389.0

(51) Int. Cl.
*G10L 15/18* (2013.01)
*G06F 40/30* (2020.01)
(Continued)

(52) U.S. Cl.
CPC .......... *G10L 15/1815* (2013.01); *G06F 1/163* (2013.01); *G06F 40/30* (2020.01);
(Continued)

(58) Field of Classification Search
None
See application file for complete search history.

(56) References Cited

U.S. PATENT DOCUMENTS 9,305,064 B1 * 4/2016 LeBeau ............... G06F 16/2458
9,740,740 B1 * 8/2017 Jett ..................... H04M 3/42042
(Continued)

FOREIGN PATENT DOCUMENTS

CN         1671130 A      9/2005
CN       102333299 A      1/2012
(Continued)

*Primary Examiner* — Thuykhanh Le
(74) *Attorney, Agent, or Firm* — Slater Matsil, LLP

(57) ABSTRACT

In one embodiment, a smartwatch includes a processor and a memory storing instructions to be executed in the processor. The instructions are configured to cause the processor to obtain input comprising voice information; determine whether the voice information comprises interrogative keyword; and determine that the voice information is interrogative information in response to determining that the voice information comprises interrogative keyword. The instructions are configured to cause the processor to determine whether reply information corresponding to the interrogative information can be obtained from a memory of the smartwatch; and send the interrogative information to a server through a wireless network in response to determining that the reply information corresponding to the interrogative information cannot be obtained from the memory of the smartwatch. The instructions are further configured to cause the processor to receive reply voice information sent by the server, and play the reply voice information.

16 Claims, 8 Drawing Sheets

(51) Int. Cl.
  *G06F 1/16* (2006.01)
  *G10L 15/22* (2006.01)
(52) U.S. Cl.
  CPC ........ *G10L 15/22* (2013.01); *G10L 2015/223* (2013.01); *G10L 2015/225* (2013.01)

(56) References Cited

U.S. PATENT DOCUMENTS

| | | | |
|---|---|---|---|
| 2002/0072905 A1* | 6/2002 | White | G10L 15/30 704/231 |
| 2002/0143551 A1* | 10/2002 | Sharma | G10L 15/30 704/270.1 |
| 2005/0210148 A1 | 9/2005 | Kato et al. | |
| 2006/0195323 A1* | 8/2006 | Monne | G10L 15/30 704/270.1 |
| 2007/0027693 A1* | 2/2007 | Hanazawa | G10L 15/32 704/275 |
| 2007/0094032 A1* | 4/2007 | Bennett | G06F 16/24522 704/270.1 |
| 2010/0057450 A1* | 3/2010 | Koll | G10L 15/32 704/231 |
| 2010/0057451 A1* | 3/2010 | Carraux | G10L 15/30 704/231 |
| 2011/0015928 A1* | 1/2011 | Odell | G10L 15/30 704/257 |
| 2011/0054899 A1* | 3/2011 | Phillips | G10L 15/30 704/235 |
| 2011/0060586 A1* | 3/2011 | Dhawan | H04M 1/2478 704/231 |
| 2011/0184740 A1* | 7/2011 | Gruenstein | G10L 15/32 704/275 |
| 2012/0259623 A1* | 10/2012 | Dragosh | H04M 3/4936 704/201 |
| 2012/0311318 A1 | 12/2012 | Kuno et al. | |
| 2013/0036134 A1* | 2/2013 | Neven | G06K 9/00295 707/769 |
| 2013/0060571 A1* | 3/2013 | Soemo | G06F 3/011 704/251 |
| 2013/0132084 A1* | 5/2013 | Stonehocker | G10L 15/30 704/244 |
| 2013/0132089 A1* | 5/2013 | Fanty | G10L 15/30 704/270 |
| 2013/0151250 A1* | 6/2013 | VanBlon | G10L 15/30 704/235 |
| 2014/0058732 A1* | 2/2014 | Labsky | G10L 15/30 704/254 |
| 2014/0088967 A1* | 3/2014 | Kawamura | G10L 15/30 704/251 |
| 2014/0163977 A1* | 6/2014 | Hoffmeister | G10L 15/32 704/232 |
| 2015/0120288 A1* | 4/2015 | Thomson | G10L 15/22 704/231 |
| 2015/0120290 A1* | 4/2015 | Shagalov | G10L 15/083 704/231 |
| 2015/0120296 A1* | 4/2015 | Stern | G10L 15/30 704/236 |
| 2015/0170653 A1* | 6/2015 | Berndt | G10L 15/22 704/275 |
| 2015/0180967 A1 | 6/2015 | Takagishi | |
| 2015/0221319 A1* | 8/2015 | Cartwright | G10L 19/032 704/205 |
| 2015/0287403 A1* | 10/2015 | Holzer Zaslansky | G10L 21/10 704/231 |
| 2015/0302301 A1* | 10/2015 | Petersen | G06Q 10/107 706/11 |
| 2015/0319097 A1* | 11/2015 | Hyatt | H04L 43/00 709/224 |
| 2015/0326713 A1 | 11/2015 | Yang et al. | |
| 2016/0005410 A1* | 1/2016 | Parilov | G10L 25/54 704/500 |
| 2016/0034679 A1* | 2/2016 | Yun | G02B 27/0172 340/5.83 |
| 2016/0037346 A1* | 2/2016 | Boettcher | H04L 63/0853 455/411 |
| 2016/0094645 A1* | 3/2016 | Ashutosh | H04L 67/1036 709/226 |
| 2016/0104484 A1* | 4/2016 | Chakladar | G06F 40/289 704/235 |
| 2016/0154624 A1* | 6/2016 | Son | G06F 1/169 704/235 |
| 2016/0162469 A1* | 6/2016 | Santos | G10L 15/22 704/10 |
| 2016/0164559 A1* | 6/2016 | Kim | H04W 4/38 455/575.6 |
| 2016/0164815 A1* | 6/2016 | Cho | G06F 3/04842 709/206 |
| 2016/0183046 A1* | 6/2016 | Kwon | H04W 4/80 455/456.1 |
| 2016/0198322 A1* | 7/2016 | Pitis | H04W 4/80 455/420 |
| 2016/0284349 A1* | 9/2016 | Ravindran | G10L 15/20 |
| 2016/0293168 A1* | 10/2016 | Chen | G10L 15/22 |
| 2016/0379626 A1* | 12/2016 | Deisher | G10L 15/197 704/232 |
| 2017/0185284 A1* | 6/2017 | Bhavaraju | A61B 5/7435 |
| 2017/0242890 A1* | 8/2017 | Jett | H04M 3/42025 |
| 2017/0300560 A1* | 10/2017 | Nugent | G06F 3/04842 |
| 2017/0346769 A1* | 11/2017 | McCray | G06F 40/30 |
| 2018/0279063 A1* | 9/2018 | Sun | H04S 7/302 |
| 2019/0073999 A1* | 3/2019 | Premont | G10L 15/08 |
| 2019/0222684 A1* | 7/2019 | Li | H04M 1/72519 |

FOREIGN PATENT DOCUMENTS

| | | |
|---|---|---|
| CN | 102378159 A | 3/2012 |
| CN | 102710535 A | 10/2012 |
| CN | 102982254 A | 3/2013 |
| CN | 103325008 A | 9/2013 |
| CN | 103425656 A | 12/2013 |
| CN | 103916469 A | 7/2014 |
| CN | 104951533 A | 9/2015 |
| CN | 105429929 A | 3/2016 |
| GB | 2531057 A | 4/2016 |
| WO | 2014155426 A1 | 10/2014 |

* cited by examiner

INFORMATION PROCESSING METHOD, SERVER, TERMINAL, AND INFORMATION PROCESSING SYSTEM

CROSS-REFERENCE TO RELATED APPLICATIONS

This application is a national stage of International Application No. PCT/CN2017/086316, filed on May 27, 2017, which claims priority to Chinese Patent Application No. 201610377389.0, filed on May 31, 2016. Both of the aforementioned applications are hereby incorporated by reference in their entireties.

TECHNICAL FIELD

The present invention relates to the field of data processing technologies, and in particular, to an information processing method, a server, a terminal, and an information processing system.

BACKGROUND

With continuous development of Internet technologies, application scenarios of man-machine interaction are increasingly widely used. For example, man-machine interaction has been applied to scenarios such as listening and spoken level tests of examinees, electronic commerce transactions, takeaway and fast food ordering, and intelligent navigation.

Specifically, a principle of man-machine interaction mainly is that a user sends voice information to an intelligent terminal (such as a smartphone or a smartwatch); the intelligent terminal sends the collected voice information to a cloud (or the intelligent terminal first performs semantic recognition on the voice information, and sends a semantic recognition result to the cloud). After collecting the voice of the user, the cloud performs semantic recognition on the voice, and initiates, according to a recognition result, a search in a database in which reply information corresponding to a large quantity of questions is stored (or the cloud directly performs searching according to the semantic recognition result sent by the intelligent terminal), to seek an appropriate reply and convert the reply into voice information (such as an artificial intelligence voice) and/or text information. Finally, the cloud delivers the converted-to voice information and/or text information to the intelligent terminal, so that the user listens to the voice and/or views the text.

However, when the cloud cannot understand a semantic meaning of the user, or the user needs to be provided with a personalized reply (for example, the user queries information about a relative of the user), it cannot be ensured that the cloud finds an appropriate reply in the database. When an appropriate answer cannot be found, the cloud usually replies with "Beyond the capability scope" or provides an irrelevant answer. Consequently, man-machine interaction quality is degraded and user experience is poor.

SUMMARY

Embodiments of the present invention provide an information processing method, a server, a terminal, and an information processing system, so as to resolve a problem in an existing man-machine interaction technology that communication quality of man-machine interaction is affected because a cloud usually cannot find an appropriate reply.

A first aspect provides an information processing method. In the information processing method, a server may send, to another terminal corresponding to the terminal, query information sent by a terminal, so as to obtain reply information related to the query information in a plurality of ways. This method may be implemented in the following manner: A first terminal obtains query information input by a user, and sends the query information to the server. The server receives the query information sent by the first terminal; determines whether reply information related to the query information can be obtained; and if determining that the reply information related to the query information cannot be obtained, sends the query information to a second terminal corresponding to the first terminal. The second terminal receives the query information sent by the server, obtains the reply information that is related to the query information and that is input by the user, and sends the reply information to the server. The server receives the reply information that is related to the query information and that is sent by the second terminal, and sends the reply information to the first terminal. That is, there may not be only one manner of searching a database for the reply information by the server, and the reply information related to the query information may also be obtained from the second terminal corresponding to the first terminal. This can effectively avoid a case in which an irrelevant answer is provided to the user because an answer related to the query information cannot be found in the database on a server side, thereby improving communication quality of man-machine interaction.

In a possible design, before the first terminal sends the query information to the server, it may be first determined that the first terminal cannot obtain, from a local storage of the first terminal, the reply information related to the query information.

In a possible design, if the first terminal determines that a semantic meaning of the query information cannot be recognized, or if the first terminal determines that a semantic meaning of the query information can be recognized but the reply information related to the query information cannot be found in the local storage of the first terminal based on a semantic recognition result of the query information, the first terminal determines that the reply information related to the query information cannot be obtained from the local storage of the first terminal, and sends the query information to the server. After receiving the query information, the server may first perform semantic analysis on the query information, and determine whether a semantic meaning of the query information can be recognized; or determine that a semantic meaning of the query information can be recognized, and determine, based on a semantic recognition result of the query information, whether the reply information related to the query information can be found in the corresponding database, so as to determine whether the reply information related to the query information can be obtained.

In a possible design, before sending the query information to the server, the first terminal may further determine at least one second terminal according to information that is about a specified replier and that is input by the user, and add identification information of all the determined second terminals to the query information, so as to receive the reply information related to the query information, where the reply information is sent by the server and is obtained by one or more of the at least one second terminal according to an indication of the server. When sending the query information to the second terminal corresponding to the first terminal, the server may first determine whether the query information carries the identification information of the at least one second terminal specified by the first terminal; and if no, select one or more second terminals from preset second terminals corresponding to the first terminal, and send the query information to the selected one or more second terminals; or if yes, select one or more second terminals according to the identification information of the at least one second terminal specified by the first terminal, and send the query information to the selected one or more second terminals.

In a possible design, after receiving the reply information sent by the server, the first terminal may further store the received reply information and the query information in a corresponding manner. After receiving the reply information that is related to the query information and that is sent by the second terminal, the server may also store the received reply information and the query information in a corresponding manner.

In a possible design, before sending the reply information to the server, the second terminal may further add the identification information of the second terminal to the reply information. After receiving the reply information sent by the server, the first terminal may determine, according to the identification information of the second terminal carried in the reply information, that the reply information comes from the second terminal.

In a possible design, after receiving the query information sent by the server and before sending the reply information to the server, the second terminal may send, to the server, prompt information used to indicate that the query information is being replied. The server may send, to the first terminal, the prompt information used to indicate that the query information is being replied. The first terminal may receive the prompt information that is used to indicate that the query information is being replied and that is sent by the server, and wait for a reply to the query information according to the prompt information.

A second aspect provides a terminal. The terminal has functions of the first terminal that implements the foregoing method design, and the functions can be implemented by using hardware, or can be implemented by executing corresponding software by using hardware. The hardware or software includes one or more modules corresponding to the foregoing functions. The modules may be software and/or hardware.

In a possible design, the terminal includes a processing unit, a sending unit, and a receiving unit. The processing unit is configured to obtain query information input by a user. The sending unit is configured to send the query information to a server. The receiving unit is configured to receive reply information sent by the server. The reply information is reply information that is related to the query information and that is obtained according to an indication of the server by a second terminal corresponding to the terminal.

In another possible design, the terminal includes a processor, a transmitter, and a receiver. The processor is configured to obtain query information input by a user. The transmitter is configured to send the query information to a server. The receiver is configured to receive reply information sent by the server. The reply information is reply information that is related to the query information and that is obtained according to an indication of the server by a second terminal corresponding to the terminal. The terminal may further include a memory, and the memory is configured to couple to the processor, and store a program instruction and data that are necessary for the terminal.

A third aspect provides a server. The server has functions of the server that implements the foregoing method design, and the functions can be implemented by using hardware, or can be implemented by executing corresponding software by using hardware. The hardware or software includes one or more modules corresponding to the foregoing functions. The modules may be software and/or hardware.

In a possible design, the server includes a receiving unit, a processing unit, and a sending unit. The receiving unit is configured to receive query information sent by a first terminal. The processing unit is configured to determine whether reply information related to the query information can be obtained. The sending unit is configured to: if it is determined, according to a determining result of the processing unit, that the reply information related to the query information cannot be obtained, send the query information to a second terminal corresponding to the first terminal. The receiving unit is further configured to receive the reply information that is related to the query information and that is sent by the second terminal. The sending unit is further configured to send the reply information to the first terminal.

In another possible design, the server includes a receiver, a processor, and a transmitter. The receiver is configured to receive query information sent by a first terminal. The processor is configured to determine whether reply information related to the query information can be obtained. The transmitter is configured to: if it is determined, according to a determining result of the processor, that the reply information related to the query information cannot be obtained, send the query information to a second terminal corresponding to the first terminal. The receiver is further configured to receive the reply information that is related to the query information and that is sent by the second terminal. The transmitter is further configured to send the reply information to the first terminal. The server may further include a memory, and the memory is configured to couple to the processor, and store a program instruction and data that are necessary for the server.

A fourth aspect provides a terminal. The terminal has functions of the second terminal that implements the foregoing method design, and the functions can be implemented by using hardware, or can be implemented by executing corresponding software by using hardware. The hardware or software includes one or more modules corresponding to the foregoing functions. The modules may be software and/or hardware.

In a possible design, the terminal includes a receiving unit, a processing unit, and a sending unit. The receiving unit is configured to receive query information sent by a server. The query information is sent, by the server to the terminal corresponding to a first terminal, after the server determines, according to the query information sent by the first terminal, that reply information related to the query information cannot be obtained. The processing unit is configured to obtain the reply information that is related to the query information and that is input by a user. The sending unit is configured to send the reply information to the server, so that the server sends the reply information to the first terminal.

In another possible design, the terminal includes a receiver, a processor, and a transmitter. The receiver is configured to receive query information sent by a server. The query information is sent, by the server to the terminal corresponding to a first terminal, after the server determines, according to the query information sent by the first terminal, that reply information related to the query information cannot be obtained. The processor is configured to obtain the reply information that is related to the query information and that is input by a user. The transmitter is configured to send the reply information to the server, so that the server sends the reply information to the first terminal. The terminal may further include a memory, and the memory is configured to couple to the processor, and store a program instruction and data that are necessary for the terminal.

According to a fifth aspect, an embodiment of the present invention provides an information processing system. The system includes the first terminal (the terminal described in the second aspect), the server (the server described in the third aspect), and the second terminal (the terminal described in the fourth aspect) that are described in the foregoing aspects.

According to a sixth aspect, an embodiment of the present invention provides a computer storage medium, configured to store a computer software instruction used by the first terminal (the terminal described in the second aspect), where the computer software instruction includes a program used to execute operations related to the first terminal in the foregoing aspect.

According to a seventh aspect, an embodiment of the present invention provides a computer storage medium, configured to store a computer software instruction used by the server (the server described in the third aspect), where the computer software instruction includes a program used to execute operations related to the server in the foregoing aspect.

According to an eighth aspect, an embodiment of the present invention provides a computer storage medium, configured to store a computer software instruction used by the second terminal (the terminal described in the fourth aspect), where the computer software instruction includes a program used to execute operations related to the second terminal in the foregoing aspect.

According to the information processing method, the server, the terminal, and the information processing system provided in the embodiments of the present invention, during processing of query information sent by the first terminal, there may not be only one manner of searching a database for reply information by the server, and the reply information related to the query information may also be obtained from the second terminal corresponding to the first terminal. This can effectively avoid a case in which an irrelevant answer is provided to a user because an answer related to the query information cannot be found in the database on a server side, thereby improving communication quality of man-machine interaction.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further details the present invention with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
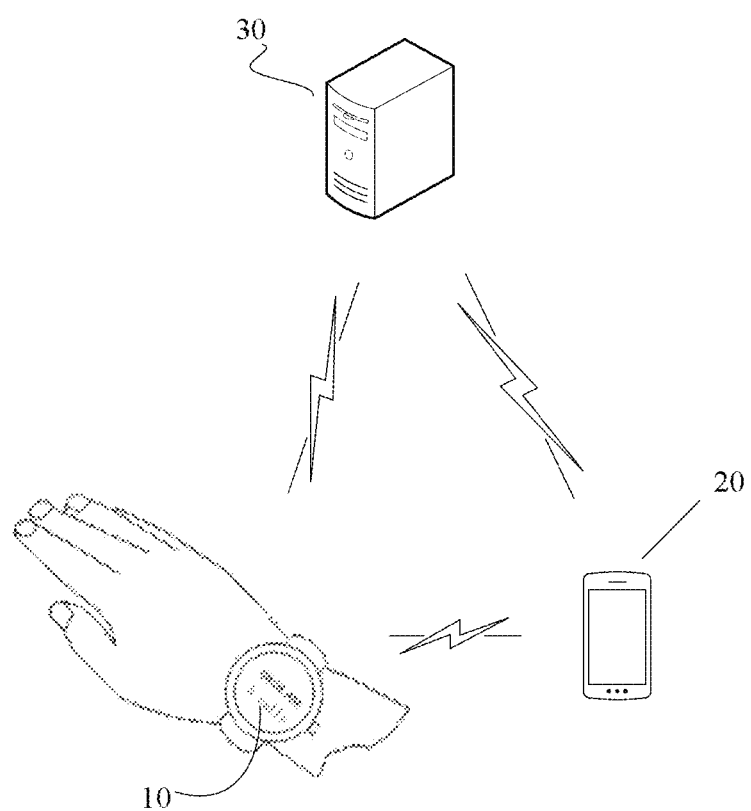
FIG. 1 is a schematic diagram of an applicable scenario of an information processing method according to an embodiment of the present invention.

The embodiments of the present invention relate to an information processing method applicable to a man-machine interaction scenario. As shown in FIG. 1, FIG. 1 is a schematic diagram of an applicable scenario of the method. A first terminal 10, a second terminal 20, and a server 30 are included. Radio communication may be performed between the first terminal 10, the second terminal 20, and the server 30. For example, the first terminal 10 or the second terminal 20 may send, through a wireless communications link, a radio signal to the server 30 through a radio frequency circuit and an antenna of the first terminal 10 or the second terminal 20, and request the server 30 to process a specific service requirement of the first terminal 10 or the second terminal 20. For another example, the server 30 may send content such as service information to the first terminal 10 or the second terminal 20 through a wireless communications link. For still another example, the first terminal 10 may establish a connection to the second terminal 20 through a short-range communications technology (such as Bluetooth or Wi-Fi), then perform data communication with the second terminal 20 through a Bluetooth communications link or the like. Certainly, the first terminal 10 may perform data communication with the second terminal 20 through another short-range communications technology, such as a Wi-Fi communications technology or a radio frequency identification technology.

The first terminal and the second terminal may be intelligent terminals with a voice and/or text information collection function, such as smartphones, tablet computers, and smartwatches. This is not further described.

Specifically, in the information processing method provided in the embodiments of the present invention, the server 30 receives query information sent by the first terminal 10. The server 30 determines whether reply information related to the query information can be obtained. If the server 30 determines that the reply information related to the query information cannot be obtained, the server 30 sends the query information to the second terminal 20 corresponding to the first terminal 10. The server 30 receives the reply information that is related to the query information that is sent by the second terminal 20, and sends the reply information to the first terminal 10.

That is, during processing of the query information sent by the first terminal, there may not be only one manner of searching a database for the reply information by the server, and the reply information related to the query information may also be obtained from the second terminal corresponding to the first terminal. This can effectively avoid a case in which an irrelevant answer is provided to a user because an answer related to the query information cannot be found in a database on the server side, thereby improving communication quality of man-machine interaction.

Figure 2:
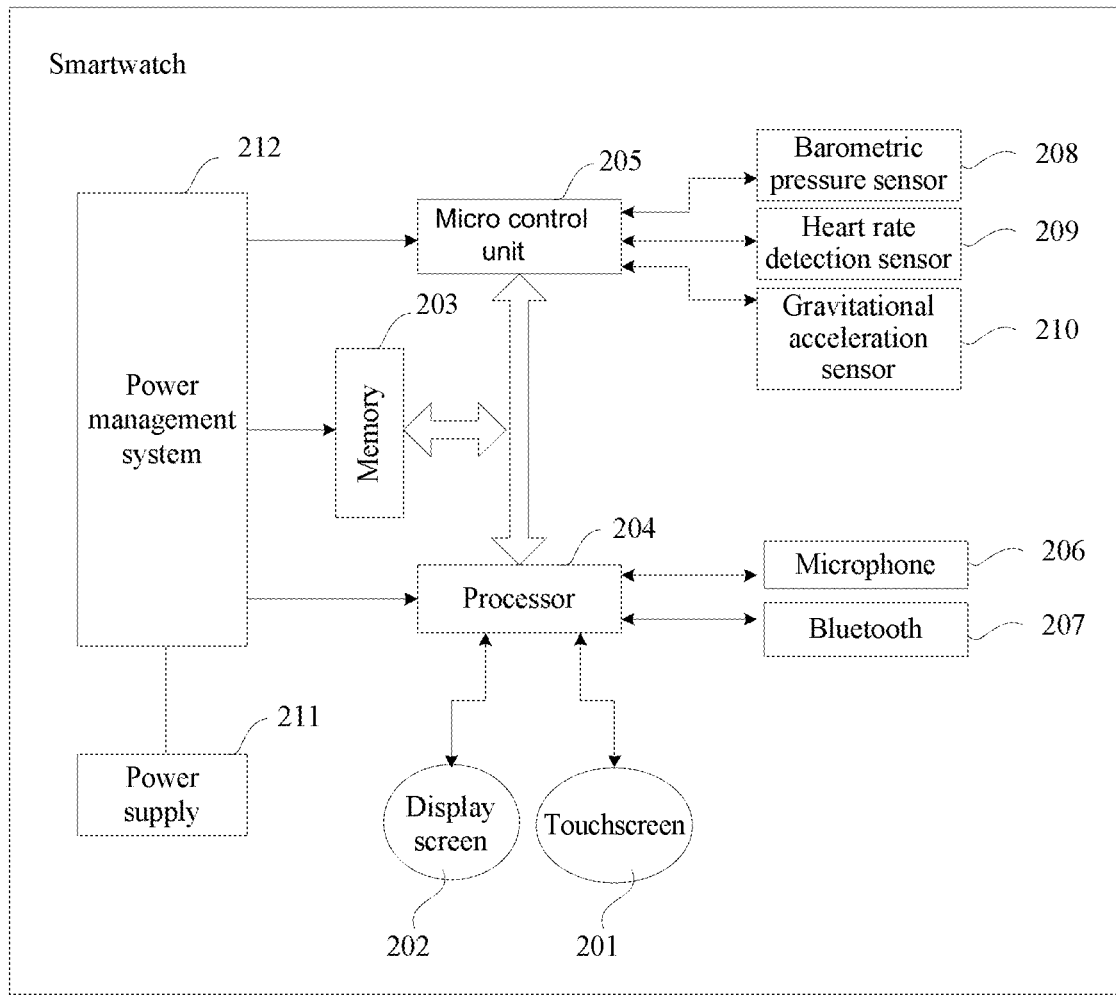
FIG. 2 is a possible schematic structural diagram of hardware of a smartwatch according to an embodiment of the present invention.

In an example in which the first terminal 10 is a smartwatch, the following schematically describes a structure of the first terminal 10. FIG. 2 shows a possible schematic structural diagram of the first terminal 10.

It can be seen from FIG. 2 that, the smartwatch may include a watch body and a wristband connected to each other. The watch body includes a front case (not shown in FIG. 2), a touch panel 201 (or referred to as a touchscreen), a display screen 202, a bottom case (not shown in FIG. 2), a memory 203, a processor 204, a micro control unit (MCU for short) 205, a microphone (MIC for short) 206, a Bluetooth (BT for short) 207, a barometric sensor 208, a heart rate detection sensor 209, a gravitational acceleration sensor 210, a power supply 211, a power management system 212, and the like. Although not shown, the smartwatch may further include an antenna, a wireless-fidelity (Wi-Fi for short) module, a near field communication (NFC for short) module, a Global Positioning System (GPS for short) module, a loudspeaker, an accelerometer, a gyroscope, and the like.

The touchscreen 201, or referred to as a touch panel, can collect a touch operation performed by a smartwatch user on or near the touch panel (such as an operation performed by the user on the touch panel or near the touch panel by using any proper object or accessory such as a finger or a stylus), and drive a corresponding connection apparatus according to a preset program. Optionally, the touch panel may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into contact coordinates, and sends the contact coordinates to the processor 204, and can receive a command sent by the processor 204 and execute the command. In addition, the touch panel may be implemented by using a plurality of types, such as a resistive type, a capacitive type, an infrared type, and a surface acoustic wave type. In addition to the touchscreen 201, the smartwatch may further include another input device, and the another input device may include but is not limited to a function key (such as a volume control key or an on/off key).

The display screen 202 may be configured to display information input by the user or information provided to the user, and various menus of the smartwatch. Optionally, the display screen 202 may be configured in a form of a liquid crystal display (LCD for short), an organic light-emitting diode (OLED for short), or the like. Further, the touchscreen 201 may cover the display screen 202. After detecting a touch operation on or near the touchscreen 201, the touchscreen 201 transmits information about the touch operation to the processor 204 to determine a touch event type. Then, the processor 204 provides corresponding visual output on the display screen 202 according to the touch event type. In FIG. 2, the touchscreen 201 and the display screen 202 are used as two independent components to implement input and output functions of the smartwatch. However, in some embodiments, the touchscreen 201 and the display screen 202 may be integrated to implement the input and output functions of the smartwatch.

The memory 203 is configured to store a software program and data, and mainly includes a program storage area and a data storage area. The program storage area may store an operating system, and an application program required by at least one function (such as an audio playback function and an image playback function). The data storage area may store data (such as audio data and a phone book) created according to usage of the smartwatch. In addition, the memory 203 may include a high-speed random access memory, and may further include a non-volatile memory such as a disk storage device, a flash memory device, or another volatile solid-state storage device.

The processor 204 is configured to run the software program and the data stored in the memory 203, so as to execute various function applications of the smartwatch and perform data processing, for example, perform system scheduling, control the display screen and the touchscreen, and support work of the microphone 206 and the Bluetooth 207. For example, the processor 204 may be a Qualcomm chip APQ8026.

The micro control unit 205 is configured to control a sensor, perform an operation on sensor data, communicate with the processor 204 bidirectionally, and the like.

The microphone 206, or referred to as a microphone, is configured to collect a sound signal, and convert the collected sound signal into an electrical signal, and an audio frequency circuit receives and converts the electrical signal into audio data. The audio frequency circuit may also convert the audio data into an electrical signal, the electrical signal is transmitted to the loudspeaker, and the loudspeaker converts the electrical signal into a sound signal for output.

The Bluetooth 207 is configured to support the smartwatch in exchanging information with another electronic device (such as a mobile phone or a tablet computer) through Bluetooth, connecting to a network by using the electronic device, connecting to a server, processing speech recognition, and implementing other functions.

The sensor may be the barometric pressure sensor 208, the heart rate detection sensor 209, the gravitational acceleration sensor 210, an optical sensor (not shown in FIG. 2), a motion sensor, or another sensor. Specifically, the optical sensor may include an ambient light sensor and a proximity sensor. For another sensor that may also be configured in the smartwatch such as a gyroscope, a barometer, a hygrometer, a thermometer, or an infrared sensor, details are not further described herein.

The smartwatch further includes the power supply 211 (for example, a battery) that supplies power to each component. Optionally, the power supply 211 may be logically connected to the processor 204 through the power management system 212, so as to implement functions such as charging and discharging management and power consumption management through the power management system 212.

Figure 3:
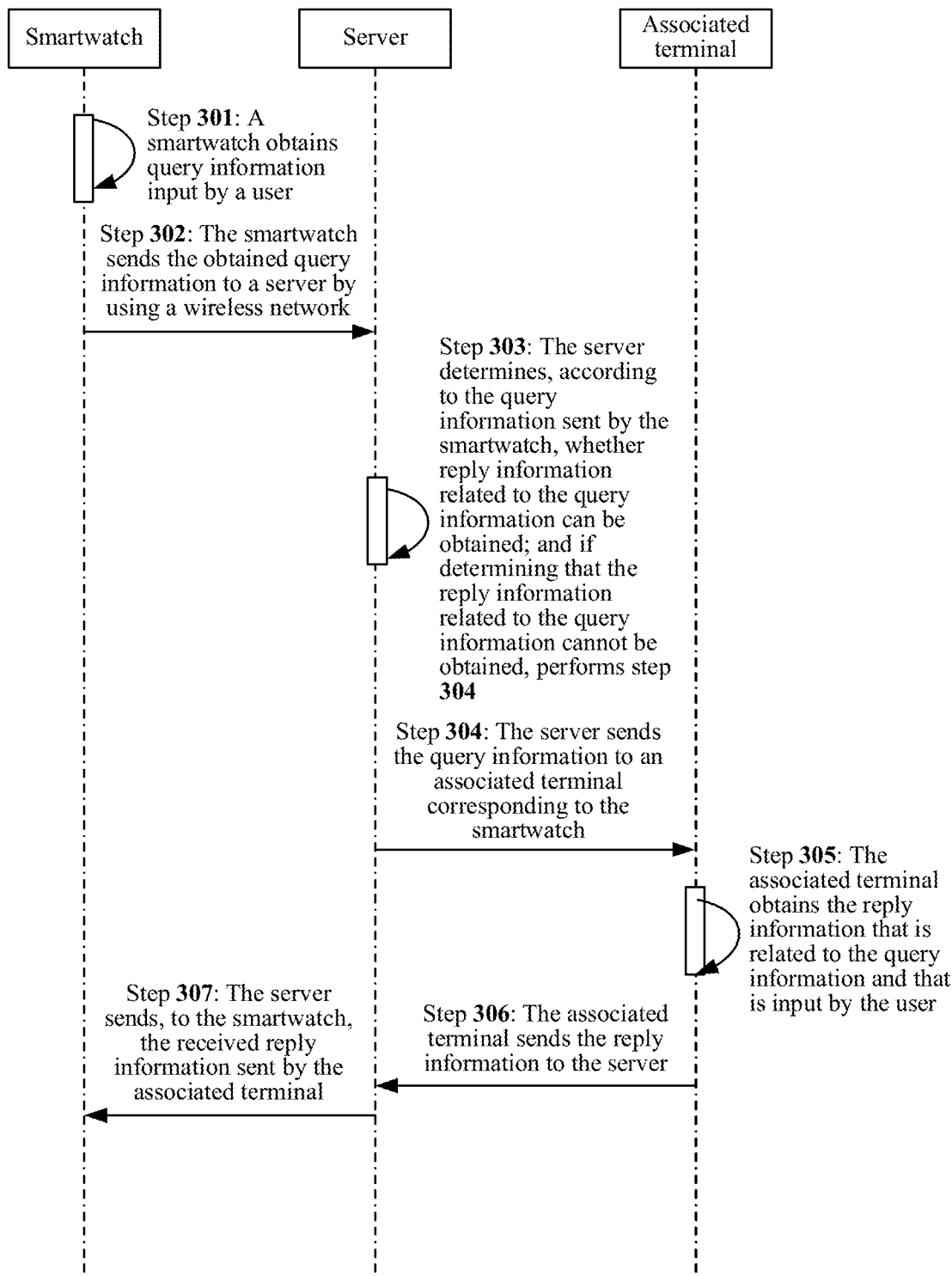
FIG. 3 is a step flowchart of an information processing method according to an embodiment of the present invention.

The following details an information processing method in an embodiment by using an example in which a smartwatch is used as the first terminal 10, another intelligent terminal (referred to as an associated terminal below) corresponding to (that is, associated with) the smartwatch is used as the second terminal 20. Specifically, as shown in FIG. 3, the method may include the following steps.

Step 301: The smartwatch obtains query information input by a user.

Optionally, the query information may include voice information and/or text information. That is, the user corresponding to the smartwatch may record and/or input the query information in the smartwatch through the microphone 206 and/or the touchscreen 201.

In addition, in this embodiment, the query information may be usually interrogative information. That is, a true meaning of the query information includes an interrogative meaning. For example, the query information may include information such as a corresponding interrogative keyword and/or an interrogation mark. Specifically, in this embodiment of the present invention, for example, the query information input by the user may be specifically as follows:

A first paradigm is "Why is seawater salty?".

A second paradigm is "What's my grandfather's name?".

A third paradigm is "What day do I go to grandfather's home?".

A fourth paradigm is "What's my father's name?".

Whether there is an interrogative keyword is determined in the information. If determining that there is an interrogative keyword, the smartwatch determines that the query information is interrogative information. For example, in the first paradigm, "why" and "what" can be considered as interrogative keywords; in the second paradigm, "what" can be considered as an interrogative keyword; in the third paradigm, "what" can be considered as an interrogative keyword; and in the fourth paradigm, "what" can be considered as an interrogative keyword. Therefore, it may indicate that the sentences are interrogative sentences according these interrogative keywords.

Step 302: The smartwatch sends the obtained query information to a server through a wireless network.

For persons skilled in the art, the smartwatch may perform wireless communication with the server on a network side through the wireless network that complies with various wireless communications protocols. For wireless communication, any one of a plurality of communications standards, protocols, and technologies may be used. These communications standards, protocols, and technologies include but are not limited to: Global system for mobile communications (GSM for short below), an Enhanced Data rates for GSM Evolution technology (EDGE for short below), High Speed Downlink Packet Access (HSDPA for short below), Wideband Code Division Multiple Access (WCDMA for short below), Code Division Multiple Access (CDMA for short below), Time Division Multiple Access (TDMA for short below), an email protocol (such as the Internet Message Access Protocol (IMAP for short below) and/or the Post Office Protocol (POP for short below)), protocols for an instant messaging and presence service (IMPS for short below) and a short message service (SMS for short below), or any other standards, protocols, and technologies suitable for wireless communication.

Optionally, before sending the obtained query information to the server, the smartwatch may first perform semantic analysis on the query information, so as to understand a true meaning of the query information and an expectation and a potential thought of the user that inputs the query information. That is, voice parsing may be performed on voice information included in the query information, and/or text parsing may be performed on text information included in the query information, or the like.

Correspondingly, the sending, by the smartwatch, the obtained query information to the server may be specifically implemented as: sending the query information on which semantic analysis has been performed (including content such as a semantic meaning analysis result) to the server.

That is, the smartwatch may send, after having performed semantic analysis on the query information, the query information obtained by the smartwatch to the server for processing. In this way, the following case can be avoided: The server needs to simultaneously perform semantic analysis on a large amount of received query information when a large number of users request a query service simultaneously. This saves processing resources of the server and reduces working load of the server, thereby increasing an information processing speed, improving information processing efficiency, and shortening a wait time of the user.

Optionally, before the smartwatch sends the query information to the server, the smartwatch may further first determine whether reply information related to the query information can be obtained from a local storage (such as the memory 203) of the smartwatch; and if yes, the smartwatch may directly convert the reply information into voice information and/or text information, and play and/or display the voice information and/or the text information through the loudspeaker and/or the display screen 202, so that the user listens to and/or views the voice information and/or text information, that is, the smartwatch does not need to perform step 302 and a subsequent step; or if no, the smartwatch sends the query information to the server.

Optionally, the smartwatch may determine, in the following manner, whether the reply information related to the query information can be obtained from the local storage (such as the memory 203) of the smartwatch. The smartwatch may first determine whether a semantic meaning of the query information can be recognized. If it is determined that the semantic meaning of the query information cannot be recognized, the smartwatch may determine that the reply information related to the query information cannot be obtained from the local storage (such as the memory 203) of the smartwatch. Alternatively, if it is determined that the semantic meaning of the query information can be recognized, the smartwatch may determine, based on a semantic recognition result of the query information, whether the reply information related to the query information can be found in the local storage (such as the memory 203) of the smartwatch. If it is determined that the reply information cannot be found, the smartwatch may determine that the reply information related to the query information cannot be obtained from the local storage (such as the memory 203) of the smartwatch. Otherwise (that is, the reply information can be found), the smartwatch may determine that the reply information related to the query information can be obtained from the local storage (such as the memory 203) of the smartwatch.

The reply information related to the query information may be reply information with relevance to the query information not less than a specified relevance threshold. The relevance threshold may be flexibly adjusted according to an actual case. For example, the relevance threshold may be 60%, 70%, or the like. For example, when the smartwatch obtains reply information related to the query information ("What day do I go to grandfather's home?") in the third paradigm, assuming that the smartwatch first finds a piece of reply information "Go home on Wednesday" in the memory 203; then, the processor 204 determines relevance between the reply information and the query information, for example, determines that the relevance between the reply information and the query information is 30%. Then, the processor 204 determines whether the determined relevance is not less than the preset relevance threshold, for example, 60%. Finally, the processor 204 determines that the relevance 30% is less than the preset relevance threshold 60%, and determines that the reply information is information unrelated to the query information.

That is, if the processor 204 of the smartwatch cannot recognize the semantic meaning of the obtained query information; or the processor 204 can recognize the semantic meaning of the query information but the processor 204 cannot find, in the memory 203 based on the semantic recognition result, the reply information related to the query information, the processor 204 may send the query information to the server. For example, the user corresponding to the smartwatch records "What's my grandfather's name?" in the smartwatch through the microphone 206, and if the processor 204 of the smartwatch cannot recognize a semantic meaning of "What's my grandfather's name?", or if the processor 204 can recognize a semantic meaning of "What's my grandfather's name?" but the processor 204 cannot find a highly-related answer in the memory 203, it is considered that the smartwatch cannot obtain reply information related to "What's my grandfather's name?" from the local storage, and the smartwatch may send the query information "What's my grandfather's name?" to the server.

Persons skilled in the art may understand that, the relevance is calculated according to the prior art. According to the optional solution, the smartwatch in this embodiment of the present invention may first search for the reply information in the local storage; and if the reply information that meets a requirement exists in the local storage, the smartwatch does not need to send the query information to the server. Therefore, this can further save processing resources of the server, reduce working load of the server. In addition, an information processing speed can be further increased, information processing efficiency can be further improved, and a wait time of the user is shortened.

In addition, optionally, the smartwatch may further skip any processing on the obtained query information, and directly send the query information to the server, so as to reduce processing pressure of the smartwatch. Processing performed on the query information by the server may be implemented according to the method described in the foregoing embodiment, and details are not further described herein.

It should be noted that, in addition to sending the query information to the server through a wireless communications link, the smartwatch may send the query information through a wired link. This is not limited herein.

In addition, optionally, before sending the obtained query information to the server, the smartwatch may further play and/or display, for the user corresponding to the smartwatch, information used to prompt the user to indicate a specified replier for the query information; determine, according to related information that is of the specified replier and that is recorded and/or input by the user, identification information used to uniquely identify a terminal corresponding to the specified replier; add the identification information of the terminal corresponding to the specified replier to the query information; and send the query information to the server.

In other words, before sending the query information to the server, the smartwatch may further determine at least one associated terminal according to the information that is about the specified replier and that is input by the user (such as a telephone number of the specified replier or an ID used for registering a related service with the terminal corresponding to the specified replier). That is, the at least one associated terminal is used as an associated reply terminal specified for the query information, and identification information of the determined at least one associated terminals is added to the query information.

For example, a child queries the smartwatch "What's my grandfather's name?", the smartwatch may reply with "Who would you expect to answer this question?". After receiving "father" replied by the child, the smartwatch obtains identification information of a terminal corresponding to the father from the local storage, adds the identification information to the query information, and sends the query information to the server. The identification information may be a telephone number of the terminal corresponding to the father, or an ID used for registering a related service with the terminal corresponding to the father. Details are not further described herein.

Step 303: The server determines, according to the query information sent by the smartwatch, whether reply information related to the query information can be obtained; and if determining that the reply information related to the query information cannot be obtained, performs step 304.

Optionally, the reply information related to the query information is the same as that described above, that is, the reply information is reply information with relevance to the query information not less than the specified relevance threshold.

Optionally, if the query information received by the server is query information on which semantic analysis has been performed by the smartwatch, the server may directly determine, based on the semantic recognition result of the query information, whether the reply information related to the query information can be found in a corresponding database.

It should be noted that, before finding the reply information in the corresponding database, the server may first convert the semantic recognition result of the query information into machine-identifiable code, extract a keyword from the query information, and search for the related reply information in the corresponding database based on the extracted keyword. This is not further described.

Optionally, if the query information received by the server is the query information on which semantic analysis has not been performed by the smartwatch, before the server determines whether the reply information related to the query information can be obtained, the method may further include: performing, by the server, semantic analysis on the query information.

That is, the server may perform semantic analysis on the query information that is sent by the smartwatch and that is received by the server, so that a performance requirement for the smartwatch may be reduced, and the method described in this embodiment of the present invention has a wider application scope. In addition, for the smartwatch, processing resources of the smartwatch can be saved, and working load of the smartwatch can be reduced.

Correspondingly, similar to determining, by the smartwatch, whether the reply information related to the query information can be obtained, determining, by the server, whether the reply information related to the query information can be obtained may specifically include: determining whether a semantic meaning of the query information can be recognized; or determining that a semantic meaning of the query information can be recognized, and determining, based on a semantic recognition result of the query information, whether the reply information related to the query information can be found in the corresponding database.

That is, if the server cannot recognize the semantic meaning of the query information, the server determines that the reply information related to the query information cannot be found; or if the server can recognize the semantic meaning of the query information but cannot find the reply information related to the query information, the server determines that the reply information related to the query information cannot be obtained.

Further, if the server determines that the reply information related to the query information can be obtained, the following step is performed: The server obtains the reply information related to the query information, and sends the obtained reply information to the smartwatch.

That is, similar to the prior art, if the server can find the reply information related to the query information in the corresponding database, the server may send the reply information to the smartwatch. Details are not further described herein.

Step 304: The server sends the query information to an associated terminal corresponding to the smartwatch.

Optionally, the sending, by the server, the query information to an associated terminal corresponding to the smartwatch may be specifically implemented as determining whether the query information carries identification information of at least one associated terminal specified by the smartwatch. If no, selecting one or more associated terminals from preset associated terminals corresponding to the smartwatch, and sending the query information to the selected one or more associated terminals. Alternatively, if yes, selecting one or more associated terminals according to the identification information of the at least one associated terminal specified by the smartwatch, and sending the query information to the selected one or more associated terminals.

In other words, if it is determined that the user corresponding to the smartwatch specifies a specified replier for the query information (that is, specifies an associated reply terminal for the query information), the query information is sent to a terminal corresponding to the specified replier; or if it is determined that the user corresponding to the smartwatch does not specify a specified replier for the query information, the query information is sent to one or more of the preset associated terminals corresponding to the smartwatch.

Optionally, if the query information that is sent by the smartwatch and that is received by the server carries the identification information of the associated terminal specified by the smartwatch, the server may not perform the operation of determining whether the reply information related to the query information can be obtained in step 303. Instead, the server may directly send the query information to the associated terminal corresponding to the identification information, to instruct the associated terminal to obtain the reply information according to the query information and send the reply information to the server, or instruct the associated terminal to obtain the reply information according to the query information and then send the reply information to the smartwatch.

In other words, when requesting a query service with a relatively strong personalized service by using the smartwatch, the user may indicate a specified replier for the current query service. The specified replier may be a replier that most probably provides a correct answer to a question queried by the user. When receiving the personalized query information, the server may not need to perform any operation on the query information, and directly forward the query information to the terminal corresponding to the specified replier. Therefore, this can save network resources, simplify a service procedure, shorten a wait time of the user to some extent, and improve accuracy of the reply information obtained by the user, thereby providing a personalized service to the user. For example, when a child queries the smartwatch "What's my grandfather's name?", and indicates that a specified replier is "father", after receiving the query information, the server may skip any processing on the query information, and directly send, according to identification information of a terminal corresponding to the specified replier "father", the query information to the terminal corresponding to "father", so that the child's father records and/or inputs reply information according to the query information.

Optionally, in this embodiment, for any preset associated terminal corresponding to the smartwatch, a correspondence between the associated terminal and the smartwatch may be preset by any one or more of the smartwatch, the server, another terminal to which the smartwatch establishes a network connection, or another associated terminal corresponding to the smartwatch. In addition, when a device such as the smartwatch, the another terminal to which the smartwatch establishes a network connection, or the another associated terminal corresponding to the smartwatch presets the associated terminal corresponding to the smartwatch, these devices may further send a corresponding setting result to the server for storage. This is not limited thereto.

For example, the smartwatch may preset, according to a contact selected by the user and/or contact information (such as a telephone number of the contact, or an ID used for registering a related service with a terminal corresponding to the contact) input by the user, one or more associated terminals that can provide corresponding reply information to the smartwatch, and send a corresponding setting result (such as identification information of all the associated terminals) to the server. For example, when a child uses a query function of the smartwatch for the first time, the smartwatch displays prompt information "Do you need to set an associated replier?". When the child inputs, by using the touchscreen 201, an instruction that an associated replier needs to be set, the smartwatch displays a contact list on the display screen 202 for the child to select. For example, the child selects "father" (a mobile phone number: 12345678) and "mother" (a mobile phone number: 12345679), and the smartwatch sends, to the server on a network side, identification information of a terminal corresponding to "father" and identification information of a terminal corresponding to "mother" (which may include appellations, mobile phone numbers, or the like), so as to establish a correspondence between the terminal corresponding to "father" and the smartwatch of the child and a correspondence between the terminal corresponding to "mother" and the smartwatch of the child.

In another example, the another terminal to which the smartwatch establishes a network connection (including a wired connection or a wireless connection) may preset, according to contact information (such as a telephone number of a contact or an ID used for registering a related service with a terminal corresponding to a contact) input by the user in the another terminal, one or more associated terminals that can provide corresponding reply information to the smartwatch, and send a corresponding setting result (such as identification information of all the associated terminals) to the server.

In still another example, an associated terminal that can provide corresponding reply information to the smartwatch may preset, according to contact information (such as a telephone number of a contact or an ID used for registering a related service with a terminal corresponding to a contact) input by the user in the associated terminal, one or more other associated terminals that can provide corresponding reply information to the smartwatch, and send a corresponding setting result (such as identification information of the associated terminal and all other associated terminals) to the server.

In another example, the server may receive identification information of at least one another terminal that is sent by the smartwatch, the another terminal to which the smartwatch establishes a network connection, or the associated terminal that can provide corresponding reply information to the smartwatch, determine a corresponding terminal according to all received identification information, and use the determined terminal as an associated terminal corresponding to the smartwatch. Alternatively, the server determines terminals that send, to the server, indication identification used to indicate that the terminals can provide corresponding reply information to the smartwatch, and uses the determined terminals as associated terminals corresponding to the smartwatch.

It should be noted that, to ensure privacy security of the smartwatch, when an associated terminal of the smartwatch is not set by the smartwatch, only after a corresponding device that is set queries the corresponding smartwatch and receive a grant from the corresponding smartwatch, the terminal may be used as an associated terminal corresponding to the smartwatch. This is not further described.

It can be learned from the foregoing content that, the user may preset, for the smartwatch, repliers on a plurality of terminals, including the smartwatch, the another terminal to which the smartwatch establishes a network connection, the another terminal that can provide corresponding reply information to the smartwatch, and the like. In this way, an associated terminal is set flexibly, and requirements of different users can be fully met.

For example, if the user corresponding to the smartwatch is an adult having full capacity for civil conduct, the user may set a replier on any of the terminals for the smartwatch. If the user corresponding to the smartwatch is a child, after a conservator of the child sets a terminal corresponding to the conservator as an associated terminal corresponding to the smartwatch, another replier may be set for the smartwatch only on the terminal corresponding to the conservator of the child, so that privacy security of the child is ensured.

Further, optionally, when the associated terminal corresponding to the smartwatch (including a specified or preset associated terminal) is determined, that is, when a correspondence between the smartwatch and the associated terminal is established, a priority of each associated terminal corresponding to the smartwatch may be further determined, so that the query information may be sent according to the determined priority, thereby improving information processing appropriateness and efficiency.

Optionally, the priorities of all the associated terminals corresponding to the smartwatch may be determined according to a chronological order of correspondences established between the associated terminals and the smartwatch. An associated terminal for which a correspondence with the smartwatch is established earlier has a higher priority.

For example, in an example of associated terminals specified by the smartwatch, priorities of the associated terminals specified by the smartwatch may be determined according to an order of specifying the associated terminals by the smartwatch. Specifically, for example, for an associated terminal A and an associated terminal B, if the smartwatch specifies the associated terminal A earlier than the associated terminal B, it may be considered that the associated terminal A has a higher priority than the associated terminal B.

For another example, in an example of preset associated terminals, priorities of the preset associated terminals may be determined according to an order of setting the associated terminals by selecting a contact or inputting contact information by the user corresponding to the smartwatch or another terminal. For example, for the associated terminal A and the associated terminal B, if the associated terminal A is selected earlier than the associated terminal B, it may be considered that the associated terminal A has a higher priority than the associated terminal B.

Further, optionally, the priorities of the associated terminals corresponding to the smartwatch may be determined according to correlation between the associated terminals and the smartwatch. An associated terminal with higher correlation to the smartwatch has a higher priority correspondingly.

The correlation between the associated terminals and the smartwatch may be determined according to correlation between second users corresponding to the associated terminals and a first user corresponding to the smartwatch. For example, for the associated terminal A and the associated terminal B, if a second user A corresponding to the associated terminal A is the father of the first user corresponding to the smartwatch, and a second user B corresponding to the associated terminal B is a friend of the first user corresponding to the smartwatch, because correlation between father and son is generally higher than correlation between friends, it may be considered that the associated terminal A has a higher priority than the associated terminal B.

That is, when the associated terminals corresponding to the smartwatch are set, the priorities of the associated terminals may be set according to a chronological order of establishment of correspondences between the associated terminals and the smartwatch, or the priorities of the associated terminals may be set according to correlation between the associated terminals and the smartwatch. Details are not further described herein.

In addition, it should be noted that, the priorities of the associated terminal specified by the smartwatch are usually not lower than the priorities of the preset associated terminals. In addition, if a specified associated terminal is the same as a preset associated terminal, a priority of the associated terminal that serves as both the specified associated terminal and the preset associated terminal is usually based on the priority of the specified associated terminal. This is also not further described.

Optionally, in an example, the sending, by the server, the query information to an associated terminal corresponding to the smartwatch may include selecting, according to the priorities of the associated terminals corresponding to the smartwatch, a corresponding associated terminal with a highest priority, and sending the query information to the selected associated terminal.

For example, when one or more second terminals are selected from preset second terminals corresponding to the first terminal, and the query information is sent to the selected one or more second terminals, a corresponding associated terminal with a highest priority may be selected from the preset second terminals corresponding to the first terminal, and the query information is sent to the selected associated terminal.

Alternatively, when one or more second terminals are selected according to identification information of the at least one second terminal specified by the first terminal, and the query information is sent to the selected one or more second terminals, a corresponding associated terminal with a highest priority may be selected according to the identification information of the at least one second terminal specified by the first terminal, and the query information is sent to the selected associated terminal.

For example, a child queries the smartwatch "What's my grandfather's name?"; and the smartwatch replies with "Who would you expect to answer this question?", and then the smartwatch displays a contact list through the display screen 202. The child sequentially selects items "mother" and "aunt" in the contact list by tapping the touchscreen 201. The smartwatch separately obtains identification information of terminals corresponding to "mother" and "aunt" from a local storage, adds the obtained identification information to the query information, and sends the query information to the server. Because the child selects the item "mother" earlier than selecting the item "aunt", the server considers that the terminal corresponding to "mother" has a higher priority than the terminal corresponding to "aunt", and further sends the query information to the terminal corresponding to "mother".

For another example, a child queries the smartwatch "What's my grandfather's name?"; and the smartwatch replies with "Who would you expect to answer this question?", and the smartwatch displays a contact list through the display screen 202. The child selects an item "Do not specify a replier" in the contact list by tapping the touchscreen 201. The smartwatch sends the query information to the server. The server selects an associated terminal with a highest priority from the preset associated terminals corresponding to the smartwatch, for example, a terminal corresponding to "father", and sends the query information to the terminal corresponding to "father".

Further, optionally, if the server has not received, within a specified time period (which may be flexibly set according to an actual case, for example, the time period is two minutes) feedback information that is used to indicate that the query information has been successfully received by the selected associated terminal and that is fed back by the selected associated terminal, the server determines whether there are other associated terminals corresponding to the smartwatch. If yes, the server selects an associated terminal from the other associated terminals corresponding to the smartwatch, and sends the query information to the selected associated terminal.

Optionally, when the server determines whether there are other associated terminals corresponding to the smartwatch, the server may perform determining only in a range of the specified associated terminals or only in a range of the preset associated terminals, and certainly, the server may perform determining in the two ranges. This is not limited.

For example, after the server sends the query information to the selected specified associated terminal according to the identification information of the associated terminal specified by the smartwatch, if the server has not received, within the specified time period, the feedback information that is used to indicate that the query information has been successfully received by the selected associated terminal and that is fed back by the selected associated terminal, the server may determine, only in the range of the associated terminals specified by the smartwatch, whether there is another associated terminals corresponding to the smartwatch (that is, whether there is another specified associated terminal). Alternatively, the server may further determine, in the range of the associated terminals specified by the smartwatch and in the range of the preset associated terminals, whether there is another associated terminal corresponding to the smartwatch.

After the server sends the query information to the selected preset associated terminal according to the identification information of the preset associated terminals, if the server has not received, within the specified time period, the feedback information that is used to indicate that the query information has been successfully received by the selected associated terminal and that is fed back by the selected associated terminal, the server may determine, only in the range of the preset associated terminals, whether there is another associated terminal corresponding to the smartwatch (that is, whether there is another preset associated terminal). This is not further described herein.

Optionally, when determining that there are other associated terminals corresponding to the smartwatch, the server may select, from the other associated terminals corresponding to the smartwatch, an associated terminal with a priority only lower than that of a previously selected associated terminal.

For example, if the server has not received, within the specified time period (for example, two minutes), feedback information fed back by the selected associated terminal with the highest priority, the server determines whether there is an associated terminal, with a second highest priority, corresponding to the smartwatch. If yes, the server sends the query information to the associated terminal with the second highest priority, and go so on, until the server receives feedback information fed back by any associated terminal corresponding to the smartwatch.

For example, a child queries the smartwatch "What's my grandfather's name?", and sequentially selects "mother", "aunt", and "elder sister" as specified repliers in a contact list by taping the touchscreen 201. The smartwatch separately obtains identification information of terminals corresponding to "mother", "aunt", and "elder sister" from the local storage, adds the obtained identification information to the query information, and sends the query information to the server. The server determines that a terminal corresponding to "mother" has a higher priority than a terminal corresponding to "aunt", and the terminal corresponding to "aunt" has a higher priority than a terminal corresponding to "elder sister". Therefore, the server sends the query information to the terminal corresponding to "mother". The server determines that the server has not received, within the specified time period, for example, two minutes, feedback information that is used to indicate that the query information has been successfully received and that is fed back by the terminal corresponding to "mother". In this case, the server further determines that there is still an associated terminal, with a second highest priority, corresponding to the smartwatch, such as the terminal corresponding to "aunt". Therefore, the server may send the query information to the terminal corresponding to "aunt".

For another example, a child queries the smartwatch "What's my grandfather's name?", and selects an item "Do not specify a replier" in a contact list by tapping the touchscreen 201. The smartwatch sends the query information to the server. The server selects, from the preset associated terminals corresponding to the smartwatch, an associated terminal with a highest priority, such as a terminal corresponding to "father", and sends the query information to the terminal corresponding to "father". The server determines that the server has not received, within the specified time period, for example, one minute, feedback information that is used to indicate that the query information has been successfully received and that is fed back by the terminal corresponding to "father". In this case, the server further determines that there is still an associated terminal, with a second highest priority, corresponding to the smartwatch, such as a terminal corresponding to "mother". Therefore, the server sends the query information to the terminal corresponding to "mother".

In addition, it should be noted that, if there is no other associated terminal corresponding to the smartwatch, the server may skip performing step 304 and a subsequent step, and notify the smartwatch that no associated terminal can provide reply information to the smartwatch currently, thereby preventing the user corresponding to the smartwatch from waiting for a long time. Alternatively, the server may still send, after a specified second time period (which may be flexibly set according to an actual case, for example, five minutes), the query information to a previously selected associated terminal, and goes so on, until the server receives feedback information fed back by a selected associated terminal.

For example, if it is determined that the query information carries identification information of only one associated terminal specified by the smartwatch, and that reply information related to the query information cannot be obtained from the specified associated terminal within a specified time period (which may be flexibly set, for example, five minutes), prompt information used to indicate that the reply information fails to be obtained may be sent to the smartwatch. That is, when the user requests a query service with a relatively strong personalized service by using the smartwatch, if a specified replier indicated by the user for the current query service cannot provide a reply to the query information within the specified time period, the server may inform the smartwatch that the reply information fails to be obtained, thereby preventing the user corresponding to the smartwatch from waiting for a long time.

Further, optionally, in another example, the server may alternatively randomly select an associated terminal from the associated terminals corresponding to the smartwatch, and send the query information to the selected associated terminal.

For example, when one or more second terminals are selected from the preset second terminals corresponding to the first terminal, and the query information is sent to the selected one or more second terminals, an associated terminal may be randomly selected from the preset second terminals corresponding to the first terminal, and the query information is sent to the selected associated terminal.

Alternatively, when one or more second terminals are selected according to identification information of the at least one second terminal specified by the first terminal, and the query information is sent to the selected one or more second terminals, an associated terminal may be randomly selected according to the identification information of the at least one second terminal specified by the first terminal, and the query information is sent to the selected associated terminal.

Correspondingly, if the server has not received, within the specified time period, feedback information fed back by the randomly selected associated terminal, the server may further determine whether there is another associated terminal corresponding to the smartwatch (the determining may be performed only in the range of the specified associated terminals or only in the range of the preset associated terminals, or certainly the determining may be performed in the two ranges). If yes, the server randomly (or according to a specified order) sends the query information to another associated terminal, and goes so on, until the server receives feedback information fed back by any associated terminal corresponding to the smartwatch. Details are not further described herein.

That is, the server may send the query information to an associated terminal with a highest priority, or may randomly send the query information to any associated terminal corresponding to the smartwatch. In addition, when no response is received from the selected associated terminal, the server may further send the query information to other associated terminals in turn in an orderly or disorderly manner, thereby improving processing efficiency of the query service, and shortening a wait time of the user.

Optionally, after sending the query information to the associated terminal corresponding to the smartwatch, the server may further send, to the smartwatch, prompt information used to indicate that the query information is being replied, to instruct the smartwatch to wait for a reply to the query information.

In addition, optionally, when or after sending the query information to the associated terminal, the server may further instruct the associated terminal to directly communicate with the smartwatch bidirectionally, for example, directly send the obtained reply information to the smartwatch. This is not further described.

Step 305: The associated terminal obtains the reply information that is related to the query information and that is input by the user.

Optionally, before the associated terminal obtains the reply information that is related to the query information and that is input by the user, the associated terminal may further send, to the server, feedback information used to indicate that the query information has been successfully received, so that the server forwards the feedback information to the smartwatch, and the user corresponding to the smartwatch learns that the query information has been successfully received.

Further, optionally, the associated terminal may play and/or display the received query information for the user corresponding to the associated terminal, so as to obtain the reply information that is related to the query information and that is input by the corresponding user according to the query information played and/or displayed by the associated terminal. The reply information input by the user corresponding to the associated terminal may include text information and/or voice information.

In addition, optionally, in a process of obtaining the reply information input by the user (that is, after the query information sent by the server is received and before the reply information is sent to the server), the associated terminal may further send, to the server, prompt information used to indicate that the query information is being replied (and/or who replies to the query information), so that the server forwards the prompt information to the smartwatch, to instruct the smartwatch to wait for a reply to the query information. Alternatively, in a process of obtaining, by the associated terminal, the reply information related to the query information, the associated terminal may further directly send, to the smartwatch, prompt information used to indicate that the query information is being replied, so that the user corresponding to the smartwatch can learn of a processing progress of the requested query service at any time. This is not further described.

Further, optionally, after obtaining the reply information input by the user, the associated terminal may further add, to the reply information, the identification information of the associated terminal and/or user identification information of the user corresponding to the associated terminal, so that the smartwatch can determine, according to the identification information of the associated terminal carried in the reply information, that a terminal that provides the reply information to the smartwatch is the associated terminal, that is, the user corresponding to the smartwatch can learn of a source of the reply information.

In addition, further, optionally, after obtaining the reply information input by the user, the associated terminal may further add, to the reply information, information such as time at which the associated terminal obtains the reply information and current geographic location coordinates of the associated terminal, so that the user corresponding to the smartwatch learns who replies to the query information at which time in which place.

Step 306: The associated terminal sends the reply information to the server.

Optionally, if the associated terminal also cannot obtain the reply information related to the query information, for example, in an example in which the query information is a query about a name of the grandfather of the user corresponding to the smartwatch, if the user corresponding to the associated terminal cannot know the name of the grandfather of the user corresponding to the smartwatch. The associated terminal may further send, to the server, feedback information used to indicate that the associated terminal cannot obtain the reply information related to the query information, so that the server determines, according to the received feedback information, whether there are other associated terminals corresponding to the smartwatch (the determining may be performed only in the range of the specified associated terminals or only in the range of the preset associated terminals, or certainly in the two ranges). If determining that there are other associated terminals, the server selects an associated terminal (for example, an associated terminal that can obtain the reply information related to the query information) from the other associated terminals corresponding to the smartwatch, and sends the query information to the selected associated terminal.

In addition, in a possible implementation, the associated terminal may further directly send the obtained reply information to the smartwatch through a wireless link or a wired link. Details are not further described herein.

Step 307: The server sends, to the smartwatch, the received reply information sent by the associated terminal.

Optionally, the reply information may carry the identification information of the associated terminal. After receiving the reply information sent by the server, the smartwatch may further determine, according to the identification information of the associated terminal carried in the reply information, that the reply information comes from the associated terminal. Details are not further described herein.

Further, optionally, the server may convert the reply information into corresponding voice information (such as an artificial intelligence voice) and/or text information, and send the converted-to voice information and/or text information to the smartwatch.

For example, if the reply information includes only voice information (that is, the user corresponding to the associated terminal replies to the query information by recording a voice in the associated terminal), the server may convert the voice information into text information, and send the converted-to text information and the voice information together to the smartwatch, so that the user corresponding to the smartwatch views and/or listens to the text information and/or the voice information.

If the reply information includes only text information (that is, the user corresponding to the associated terminal replies to the query information by inputting a text in the associated terminal), the server may convert the text information into voice information, and send the converted-to voice information and the text information together to the smartwatch, so that the user corresponding to the smartwatch listens to and/or views the voice information and/or the text information.

Optionally, the server may alternatively directly send the reply information to the smartwatch, and the smartwatch converts the reply information into corresponding voice information (such as an artificial intelligence voice) and/or text information, so that the user corresponding to the smartwatch listens to and/or views the voice information and/or text information. Details are not further described herein.

That is, according to a network and a resource usage status of the smartwatch, it may be flexibly to select the server or the smartwatch to convert the reply information into corresponding voice information and/or text information, so as to increase an information processing speed as much as possible.

Further, optionally, before sending the received reply information to the smartwatch, the server may further store the received reply information and the query information in a corresponding manner, so that when obtaining similar query information in future, the server can obtain, in a manner of searching and/or similarity association, the reply information related to the query information. This saves information processing resources and improves information processing efficiency.

Further, optionally, after receiving the reply information sent by the server (or the reply information directly sent by the associated terminal), the smartwatch may further store the received reply information and the query information in a corresponding manner. For example, a child queries the smartwatch "What's my grandfather's name?", and indicates that a specified replier is "father". The father replies with "Your grandfather's name is Fang Yuanbo." by using a corresponding associated terminal. After receiving the reply information, the smartwatch stores "What's my grandfather's name?" and "Your grandfather's name is Fang Yuanbo." in the memory 203 in a corresponding manner while playing and/or displaying "Your grandfather's name is Fang Yuanbo." to answer the child's question. In future, when the child plays with his playmates and shows his playmates that his smartwatch knows his grandfather's name, the child queries the smartwatch "What's my grandfather's name?", the smartwatch can replies with the child "Your grandfather's name is Fang Yuanbo." only by searching the memory 203 of the smartwatch. That is, for a strongly-personalized query service, the smartwatch may create, by storing the query information and the related reply information in a corresponding manner, a personal database for the user corresponding to the smartwatch, so that when querying similar information in future the user can obtain related reply information from the memory 203 of the smartwatch in a manner of searching and/or similarity association. This simplifies an interaction procedure of service processing and improves processing efficiency.

The following uses two specific instances to detail how to implement the method provided in the embodiment.

Figure 4:
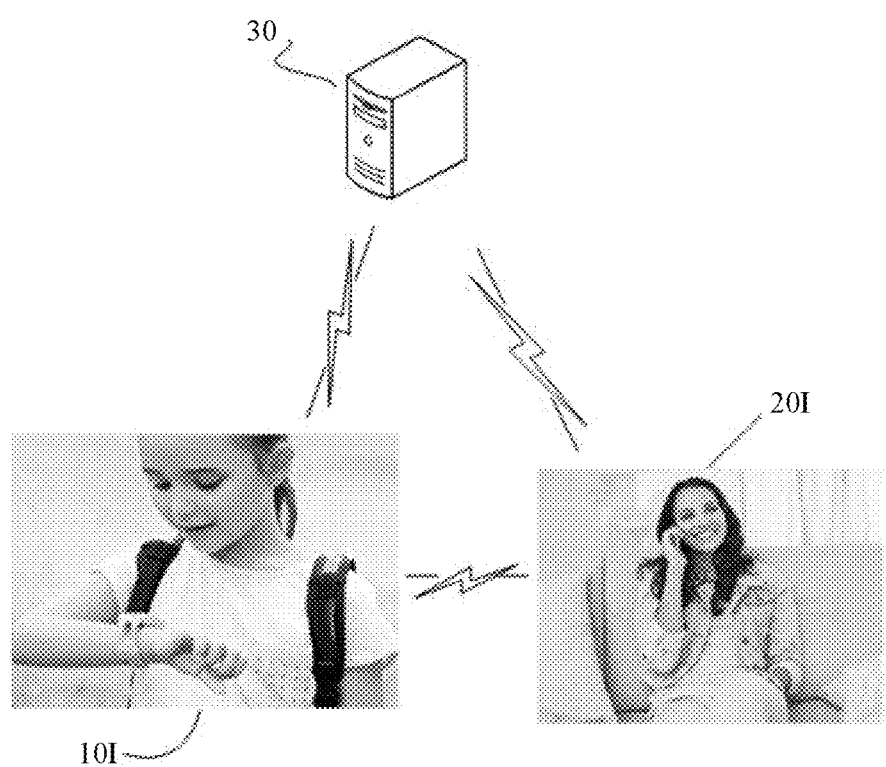
FIG. 4 is a schematic diagram of an applicable scenario of an information processing method according to an embodiment of the present invention.

Instance 1:

As shown in FIG. 4, FIG. 4 is a schematic diagram of an applicable scenario of the information processing method. An implementation procedure in which a child queries her grandfather's name by using a smartwatch 10I may include the following steps.

Step A1: The smartwatch 10I obtains voice information "What's my grandfather's name?" recorded in the smartwatch 10I by the child.

Step A2: The smartwatch 10I converts the voice information into text information, performs semantic analysis on the voice information, and determines that the voice information is interrogative information.

Step A3: The smartwatch 10I queries the child "Who would you expect to answer this question?" by playing an artificial intelligence voice, and displays a contact list (which may include one or more of appellations of contacts, telephone numbers of contacts, or IDs used for registering a related service with terminals corresponding to contacts) of the smartwatch 10I on the display screen 202.

Step A4: The smartwatch 10I determines that the child replies with "mother" through voice, or the smartwatch 10I determines that the child selects an item "mother" in the contact list by tapping the touchscreen 201.

Step A5: The smartwatch 10I packs the obtained voice information and the converted-to text information, uses the voice information and the text information as query information, adds identification information of a terminal corresponding to the child's "mother" to the query information, and sends the query information to the server 30.

Step A6: After receiving the query information, the server 30 determines whether the query information carries identification information of an associated terminal specified by the smartwatch 10I.

Step A7: The server 30 determines that the query information carries the identification information of the specified associated terminal (that is, information about a specified replier, and the identification information herein is the identification information of the terminal corresponding to "mother"), and sends the query information to an associated terminal 20I corresponding to the identification information (the associated terminal herein is the terminal corresponding to "mother" herein).

Step A8: After receiving the query information, the associated terminal 20I corresponding to the identification information (that is, the terminal corresponding to "mother") prompts a user (the child's mother); the associated terminal 20I sends, to the server 30, feedback information used to indicate that the query information has been successfully received, so that the server 30 forwards the feedback information to the smartwatch 10I; and after the child's mother clicks on the message for view, the associated terminal 20I plays the voice information in the query information, and displays the text information in the query information.

Step A9: The associated terminal 20I obtains text information "Your grandfather's name is Fang Yuanbo." input by the child's mother, and sends, to the server 30, prompt information used to indicate that the query information is being replied, so that the server 30 forwards the prompt information to the smartwatch 10I.

Step A10: The associated terminal 20I uses the obtained text information as reply information; adds the identification information of the associated terminal 20I, a time at which the associated terminal 20I obtains the text information, and current geographic location coordinates of the associated terminal 20I to the reply information; and sends the reply information to the server 30.

Step A11: The server 30 forwards the received reply information to the smartwatch 10I.

Step A12: The smartwatch 10I prompts the child; after the child clicks on the message for view, the smartwatch 10I converts the received reply information into an artificial intelligence voice, plays the converted-to artificial intelligence voice "Your grandfather's name is Fang Yuanbo.", and displays the text information "Your grandfather's name is Fang Yuanbo." through the display screen 202 of the smartwatch 10I, and also provides remark information such as replier information, a reply time, and a geographical location of the replier.

Step A13: A memory 203 of the smartwatch 10I stores the query information "What's my grandfather's name?" and the reply information "Your grandfather's name is Fang Yuanbo." in a corresponding manner.

Figure 5:
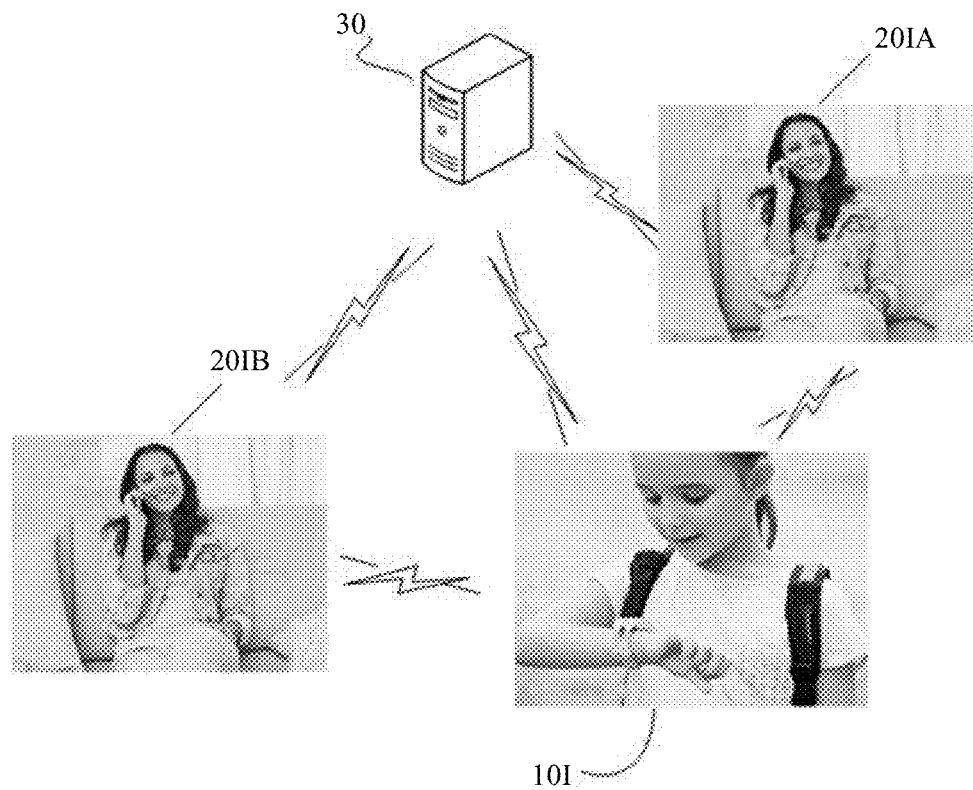
FIG. 5 is a schematic diagram of another applicable scenario of an information processing method according to an embodiment of the present invention.

Instance 2:

As shown in FIG. 5, FIG. 5 is a schematic diagram of another applicable scenario of the information processing method. An implementation procedure in which a child queries "Why is seawater salty?" through a smartwatch 10I may include the following steps.

Step B1: The smartwatch 10I obtains voice information "Why is seawater salty?" recorded in the smartwatch 10I by the child.

Step B2: The smartwatch 10I converts the voice information into text information, performs semantic analysis on the voice information, and determines that the voice information is interrogative information.

Step B3: The smartwatch 10I queries the child "Who would you expect to answer this question?" by playing an artificial intelligence voice, and displays a contact list (which may include one or more of appellations of contacts, telephone numbers of contacts, or IDs used for registering a related service with terminals corresponding to contacts) of the smartwatch 10I on the display screen 202.

Step B4: The smartwatch 10I selects an item "Do not specify a replier" in the contact list by tapping the touchscreen 201.

Step B5: The smartwatch 10I packs the obtained voice information and the converted-to text information, uses the voice information and the text information as query information, and sends the query information to the server 30.

Step B6: After receiving the query information, the server 30 determines whether the query information carries identification information of an associated terminal specified by the smartwatch 10I.

Step B7: The server 30 determines that the query information does not carry the identification information of the specified associated terminal (information about a specified replier), and sends the query information to a preset associated terminal 20IA that has a highest priority and that is corresponding to the smartwatch 10I.

Step B8: The server 30 determines whether feedback information that is used to indicate that the query information has been successfully received and that is sent by the associated terminal 20IA is received within a specified time period (it is assumed that the time period is 30 seconds).

Step B9: The server 30 determines that the server 30 has not received, within 30 seconds, the feedback information that is used to indicate that the query information has been successfully received and that is sent by the associated terminal 20IA, and sends the query information to a preset associated terminal 20IB, with a second highest priority, corresponding to the smartwatch 10I.

Step B10: The associated terminal 20IB receives the query information, and prompts a user corresponding to the associated terminal 20IB; and the associated terminal 20IB sends, to the server 30, feedback information used to indicate that the query information has been successfully received, so that the server 30 forwards the feedback information to the smartwatch 10I.

Step B11: The associated terminal 20IB obtains voice information "Because the seawater contains various kinds of salts" recorded in the associated terminal 20IB by the user corresponding to the associated terminal 20IB; and sends, to the server 30, prompt information used to indicate that the query information is being replied, so that the server 30 forwards the prompt information to the smartwatch 10I.

Step B12: The associated terminal 20IB uses the obtained voice information as reply information; adds identification information of the associated terminal 20IB, a time at which the associated terminal 20IB obtains the voice information, and current geographic location coordinates of the associated terminal 20IB to the reply information; and sends the reply information to the server 30.

Step B13: The server 30 forwards the received reply information to the smartwatch 10I, and a memory of the server 30 stores the query information "Why is seawater salty?" and the reply information "Because the seawater contains various kinds of salts" in a corresponding manner.

Step B14: The smartwatch 10I prompts the child; after the child clicks on the message for view, the smartwatch 10I converts the received reply information into text information, and plays the received voice information "Because the seawater contains various kinds of salts"; and the smartwatch 10I displays the converted-to text information "Because the seawater contains various kinds of salts" through the display screen 202 of the smartwatch 10I, and also provides remark information such as replier information, a reply time, and a geographical location of the replier.

Step B15: A memory 203 of the smartwatch 10I stores the query information "Why is seawater salty?" and the reply information "Because the seawater contains various kinds of salts" in a corresponding manner.

In conclusion, in the information processing method provided in this embodiment of the present invention, during processing of query information sent by the smartwatch, there may not be only one manner of searching a database for reply information by the server, and the reply information related to the query information may also be obtained from an associated terminal corresponding to the smartwatch. This can effectively avoid a case in which an irrelevant answer is provided to a user because an answer related to the query information cannot be found in the database on a server side, thereby improving communication quality of man-machine interaction.

Figure 6:
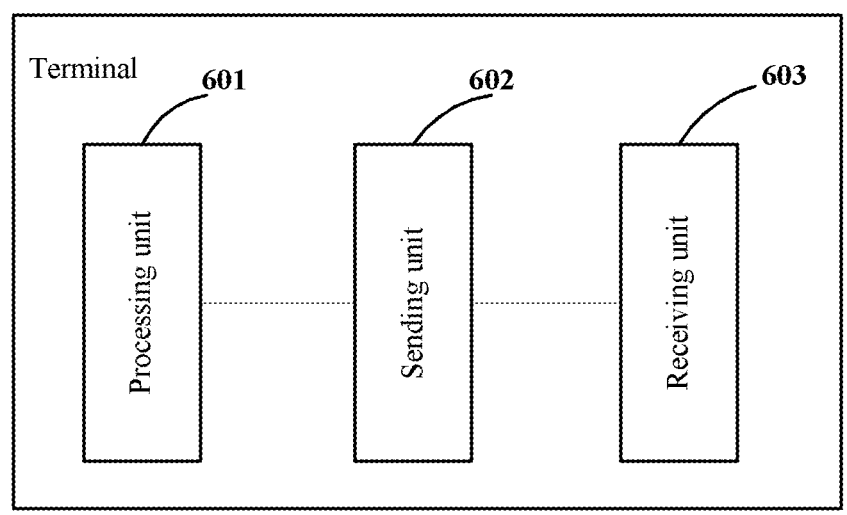
FIG. 6 is a schematic structural diagram of a terminal according to an embodiment of the present invention.

Based on the information processing method provided in the foregoing embodiment, an embodiment of the present invention further provides a terminal. The terminal has functions of the first terminal that implements the foregoing method design (the terminal may be specifically the smartwatch). The functions can be implemented by using hardware, or can be implemented by executing corresponding software by using hardware. The hardware or software includes one or more modules corresponding to the foregoing functions. The modules may be software and/or hardware. For specific implementation of the terminal, refer to related descriptions of the method, and repetitive parts are not described again. Specifically, as shown in FIG. 6, the terminal may include:

a processing unit 601, configured to obtain query information input by a user;

a sending unit 602, configured to send the query information to a server; and a receiving unit 603, configured to receive reply information sent by the server, where the reply information is reply information that is related to the query information and that is obtained according to an indication of the server by a second terminal corresponding to the terminal.

Optionally, the processing unit 601 may be further configured to: before the sending unit 602 sends the query information to the server, determine that the reply information related to the query information cannot be obtained from a local storage of the terminal.

Further, optionally, the processing unit 601 may be specifically configured to determine, in the following manner, that the reply information related to the query information cannot be obtained from the local storage of the terminal:

determining that a semantic meaning of the query information cannot be recognized; or determining that a semantic meaning of the query information can be recognized but the reply information related to the query information cannot be found in the local storage of the terminal based on a semantic recognition result of the query information.

In other words, before sending the query information to the server, the terminal may first determine whether the reply information related to the query information can be obtained from the local storage of the terminal, and if yes, the terminal does not need to send the query information to the server. This can save processing resources of the server, reduce working load of the server, increase an information processing rate, improve information processing efficiency, and shorten a wait time of the user.

Optionally, the sending unit 602 may be further configured to: before sending the query information to the server, determine at least one second terminal according to information that is about a specified replier and that is input by the user, and add identification information of all the determined second terminals to the query information.

Correspondingly, the receiving unit 603 may be specifically configured to receive the reply information related to the query information. The reply information is sent by the server, and is obtained by one or more of the at least one second terminal according to the indication of the server.

In other words, before sending the query information to the server, the terminal may further determine at least one associated terminal according to the information that is about the specified replier and that is input by the user (such as a telephone number of the specified replier or an ID used for registering a related service with a terminal corresponding to the specified replier). That is, the at least one associated terminal is used as an associated reply terminal specified for the query information, and identification information of all the determined associated terminals is added to the query information.

Optionally, the terminal may further include a storage unit (not shown in FIG. 6), configured to store the reply information received by the receiving unit 603 and the query information in a corresponding manner.

In other words, after receiving the reply information sent by the server (or the reply information directly sent by the associated terminal), the terminal may further store the received reply information and the query information in a corresponding manner. Therefore, for a strongly-personalized query service, the terminal may create, by storing the query information and the related reply information in a corresponding manner, a personal database for the user corresponding to the terminal, so that when querying similar information in future, the user can obtain related reply information from the storage unit of the terminal in a manner of searching and/or similarity association. This simplifies an interaction procedure of service processing and improves processing efficiency.

Optionally, the reply information carries identification information of the second terminal, and the receiving unit 603 may be further configured to: after receiving the reply information sent by the server, determine, according to the identification information of the second terminal carried in the reply information, that the reply information comes from the second terminal.

Optionally, the receiving unit 603 may be further configured to: after the sending unit 602 sends the query information to the server and before the receiving unit 603 receives the reply information sent by the server, receive prompt information that is used to indicate that the query information is being replied and that is sent by the server, and wait for a reply to the query information according to the prompt information.

Figure 7:
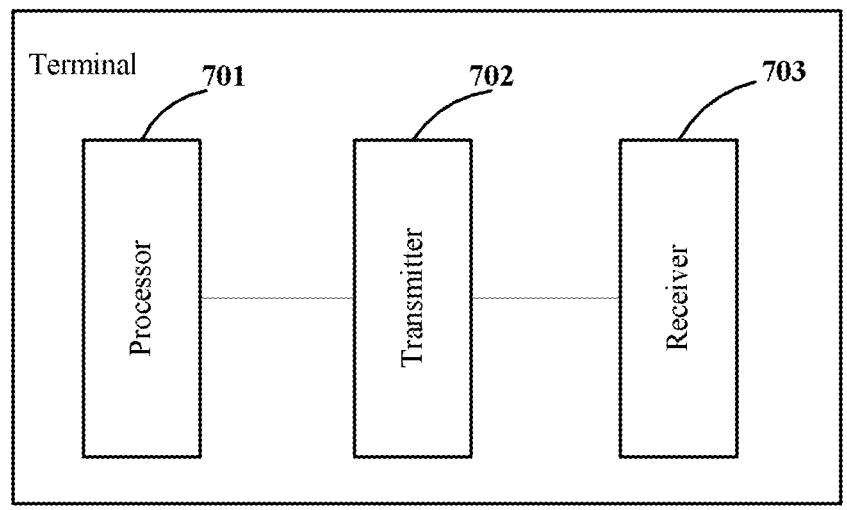
FIG. 7 is another schematic structural diagram of a terminal according to an embodiment of the present invention.

FIG. 7 is another schematic structural diagram of a terminal according to an embodiment of the present invention. As shown in FIG. 7, the terminal includes a processor 701, a transmitter 702, and a receiver 703. The processor 701 is configured to obtain query information input by a user. The transmitter 702 is configured to send the query information to a server. The receiver 703 is configured to receive reply information sent by the server. The reply information is reply information that is related to the query information and that is obtained according to an indication of the server by a second terminal corresponding to the terminal. The terminal may further include a memory (not shown in FIG. 7), and the memory is configured to couple to the processor, and store a program instruction and data that are necessary for the terminal.

Optionally, the processor 701 may be further configured to: before the query information is sent to the server, determine that the reply information related to the query information cannot be obtained in the memory of the terminal.

Further, optionally, the processor 701 may be specifically configured to: if determining that a semantic meaning of the query information cannot be recognized, or if determining that a semantic meaning of the query information can be recognized but the reply information related to the query information cannot be found in the memory based on a semantic recognition result of the query information, determine that the reply information related to the query information cannot be obtained in the memory of the terminal.

Optionally, the transmitter 702 may be further configured to: before sending the query information to the server, determine at least one second terminal according to information that is about a specified replier and that is input by the user, and add identification information of all the determined second terminals to the query information. Correspondingly, the receiver 703 may be specifically configured to receive the reply information related to the query information, where the reply information is sent by the server, and is obtained by one or more of the at least one second terminal according to the indication of the server.

Optionally, the processor 701 may be further configured to store, in the memory in a corresponding manner, the reply information received by the receiver 703 and the query information.

Optionally, the reply information carries identification information of the second terminal. Correspondingly, the receiver 703 may be further configured to: after receiving the reply information sent by the server, determine, according to the identification information of the second terminal carried in the reply information, that the reply information comes from the second terminal.

Optionally, the receiver 703 may be further configured to: after the transmitter 702 sends the query information to the server, and before the receiver 703 receives the reply information sent by the server, receive prompt information that is used to indicate that the query information is being replied and that is sent by the server, and wait for a reply to the query information according to the prompt information.

Figure 8:
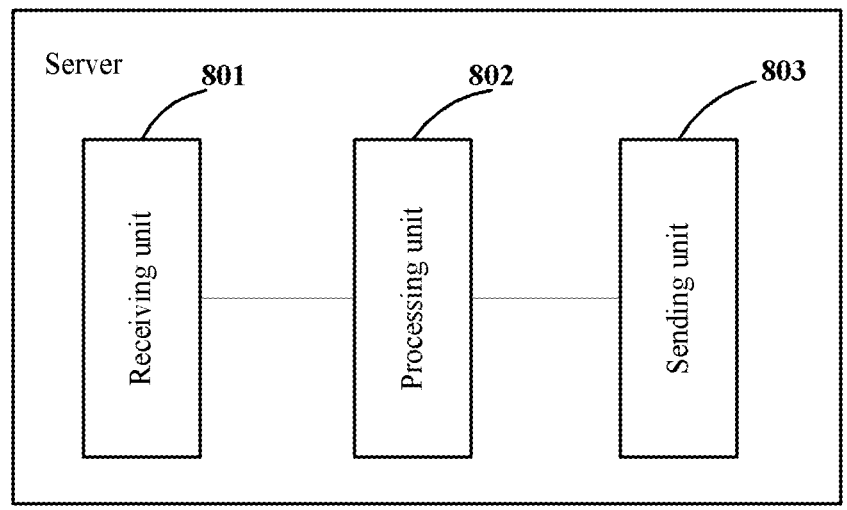
FIG. 8 is a schematic structural diagram of a server according to an embodiment of the present invention.

Based on the information processing method provided in the foregoing embodiment, an embodiment of the present invention further provides a server. The server has functions of the server that implements the foregoing method design, and the functions can be implemented by using hardware, or can be implemented by executing corresponding software by using hardware. The hardware or software includes one or more modules corresponding to the foregoing functions. The modules may be software and/or hardware. For specific implementation of the server, refer to related descriptions of the method, and repetitive parts are not described again. Specifically, as shown in FIG. 8, the server may include:

a receiving unit 801, configured to receive query information sent by a first terminal;

a processing unit 802, configured to determine whether reply information related to the query information can be obtained; and a sending unit 803, configured to: if it is determined, according to a determining result of the processing unit 802, that the reply information related to the query information cannot be obtained, send the query information to a second terminal corresponding to the first terminal, where the receiving unit 801 is further configured to receive the reply information that is related to the query information and that is sent by the second terminal; and the sending unit 803 is further configured to send the reply information to the first terminal.

Optionally, the processing unit 802 may be further configured to: before determining whether the reply information related to the query information can be obtained, perform semantic analysis on the query information.

Correspondingly, the processing unit 802 may be specifically configured to determine, according to the following step, whether the reply information related to the query information can be obtained:

determining whether a semantic meaning of the query information can be recognized; or determining that a semantic meaning of the query information can be recognized, and determining, based on a semantic recognition result of the query information, whether the reply information related to the query information can be found in a corresponding database.

Optionally, the sending unit 803 may be specifically configured to: determine whether the query information carries identification information of at least one second terminal specified by the first terminal; and if no, select one or more second terminals from preset second terminals corresponding to the first terminal, and send the query information to the selected one or more second terminals; or if yes, select one or more second terminals according to the identification information of the at least one second terminal specified by the first terminal, and send the query information to the selected one or more second terminals.

In other words, if it is determined that a user corresponding to the first terminal specifies a specified replier for the query information (that is, specifies an associated reply terminal for the query information), the query information is sent to a terminal corresponding to the specified replier; or if it is determined that a user corresponding to the first terminal does not specify a specified replier for the query information, the query information is sent to one or more of preset associated terminals corresponding to the first terminal.

Therefore, when requesting a query service with a relatively strong personalized service by using the first terminal, the user may indicate a specified replier for the current query service. The specified replier may be a replier that most probably provides a correct answer to a question queried by the user. When receiving the personalized query information, the server may not need to perform any operation on the query information, and directly forward the query information to the terminal corresponding to the specified replier. Therefore, this can save network resources, simplify a service procedure, shorten a wait time of the user to some extent, and improve accuracy of the reply information obtained by the user, thereby providing a personalized service to the user.

Optionally, the sending unit 803 may be specifically configured to select a corresponding second terminal with a highest priority according to priorities of all the second terminals corresponding to the first terminal, and send the query information to the selected second terminal.

Optionally, the server may further include a storage unit (not shown in FIG. 8), configured to: after the receiving unit 801 receives the reply information that is related to the query information and that is sent by the second terminal, store the received reply information and the query information in a corresponding manner.

Optionally, the sending unit 803 may be further configured to: after the sending unit 803 sends the query information to the second terminal corresponding to the first terminal, and before the receiving unit 801 receives the reply information that is related to the query information and that is sent by the second terminal, send, to the first terminal, prompt information used to indicate that the query information is being replied, to instruct the first terminal to wait for a reply to the query information.

Figure 9:
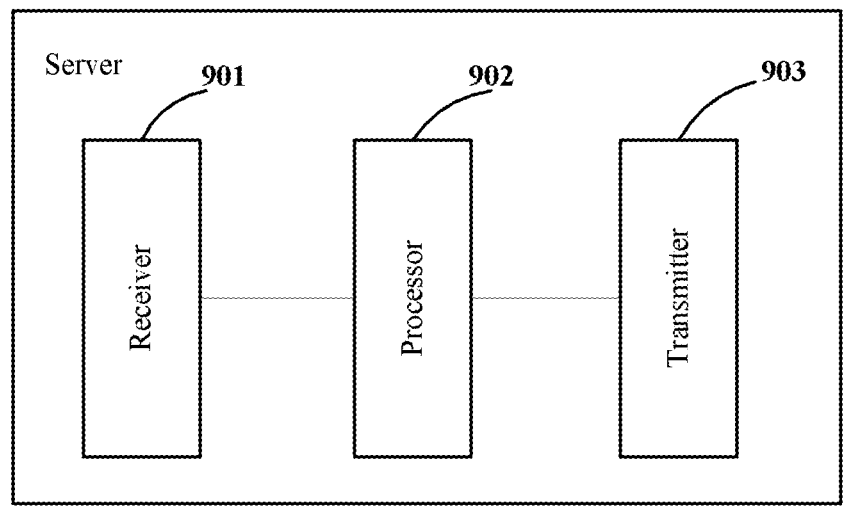
FIG. 9 is another schematic structural diagram of a server according to an embodiment of the present invention.

FIG. 9 is another schematic structural diagram of a server according to an embodiment of the present invention. As shown in FIG. 9, the server includes a receiver 901, a processor 902, and a transmitter 903. The receiver 901 is configured to receive query information sent by a first terminal. The processor 902 is configured to determine whether reply information related to the query information can be obtained. The transmitter 903 is configured to: if it is determined, according to a determining result of the processor 902, that the reply information related to the query information cannot be obtained, send the query information to a second terminal corresponding to the first terminal. The receiver 901 is further configured to receive the reply information that is related to the query information and that is sent by the second terminal. The transmitter 903 is further configured to send the reply information to the first terminal. The server may further include a memory (not shown in FIG. 9), and the memory is configured to couple to the processor, and store a program instruction and data that are necessary for the server.

Figure 10:
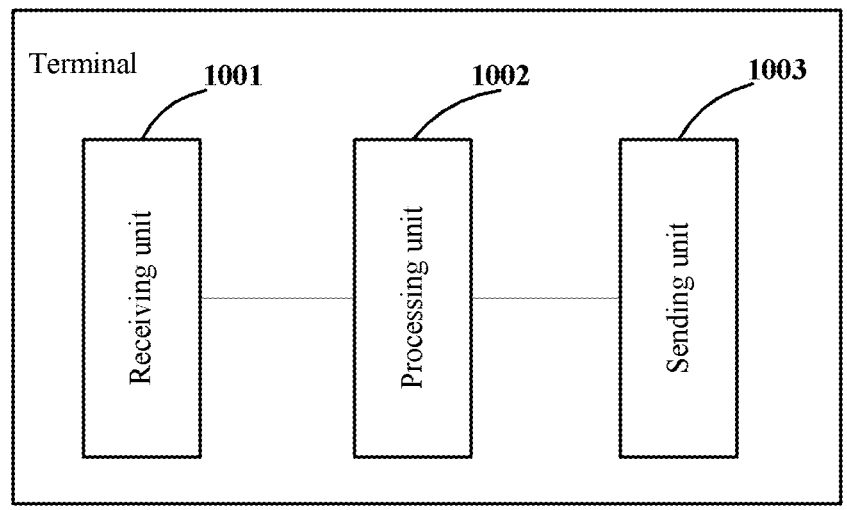
FIG. 10 is a schematic structural diagram of another terminal according to an embodiment of the present invention.

Based on the information processing method provided in the foregoing embodiment, an embodiment of the present invention further provides another terminal. The terminal has functions of the second terminal that implements the foregoing method design, and the functions can be implemented by using hardware, or can be implemented by executing corresponding software by using hardware. The hardware or software includes one or more modules corresponding to the foregoing functions. The modules may be software and/or hardware. For specific implementation of the terminal, refer to related descriptions of the method, and repetitive parts are not described again. Specifically, as shown in FIG. 10, the terminal may include:

a receiving unit 1001, configured to receive query information sent by a server, where the query information is sent, by the server to the second terminal corresponding to a first terminal, after the server determines, according to the query information sent by the first terminal, that reply information related to the query information cannot be obtained;

a processing unit 1002, configured to obtain the reply information that is related to the query information and that is input by a user; and a sending unit 1003, configured to send the reply information to the server, so that the server sends the reply information to the first terminal.

Optionally, the sending unit 1003 may be further configured to: before sending the reply information to the server, add identification information of the terminal to the reply information, so that the first terminal determines, according to the identification information of the terminal carried in the reply information, that the reply information comes from the terminal.

Optionally, the sending unit 1003 may be further configured to: after the receiving unit 1001 receives the query information sent by the server, and before the sending unit 1003 sends the reply information to the server, send, to the server, prompt information used to indicate that the query information is being replied, so that the server instructs, according to the prompt information, the first terminal to wait for a reply to the query information.

Figure 11:
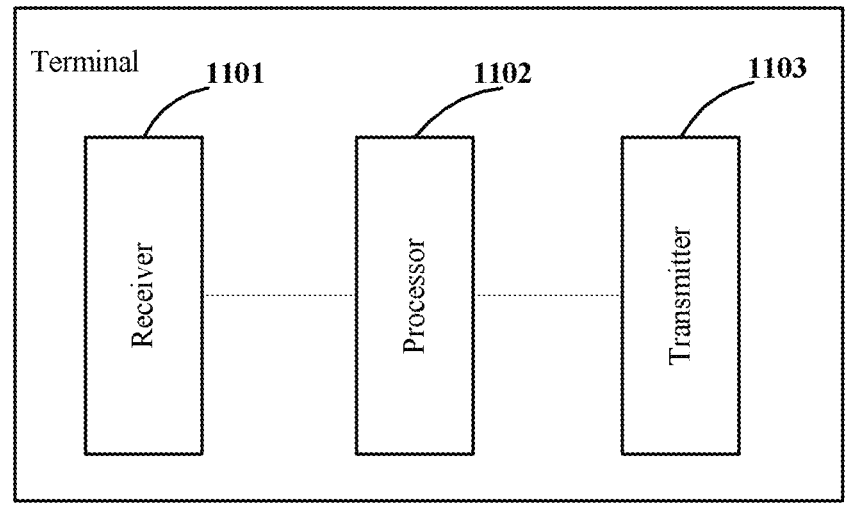
FIG. 11 is another schematic structural diagram of another terminal according to an embodiment of the present invention.

FIG. 11 is another schematic structural diagram of another terminal according to an embodiment of the present invention. As shown in FIG. 11, the terminal includes a receiver 1101, a processor 1102, and a transmitter 1103. The receiver 1101 is configured to receive query information sent by a server. The query information is sent, by the server to the terminal corresponding to a first terminal, after the server determines, according to the query information sent by the first terminal, that reply information related to the query information cannot be obtained. The processor 1102 is configured to obtain the reply information that is related to the query information and that is input by a user. The transmitter 1103 is configured to send the reply information to the server, so that the server sends the reply information to the first terminal. The terminal may further include a memory (not shown in FIG. 11), and the memory is configured to couple to the processor, and store a program instruction and data that are necessary for the terminal.

Figure 12:
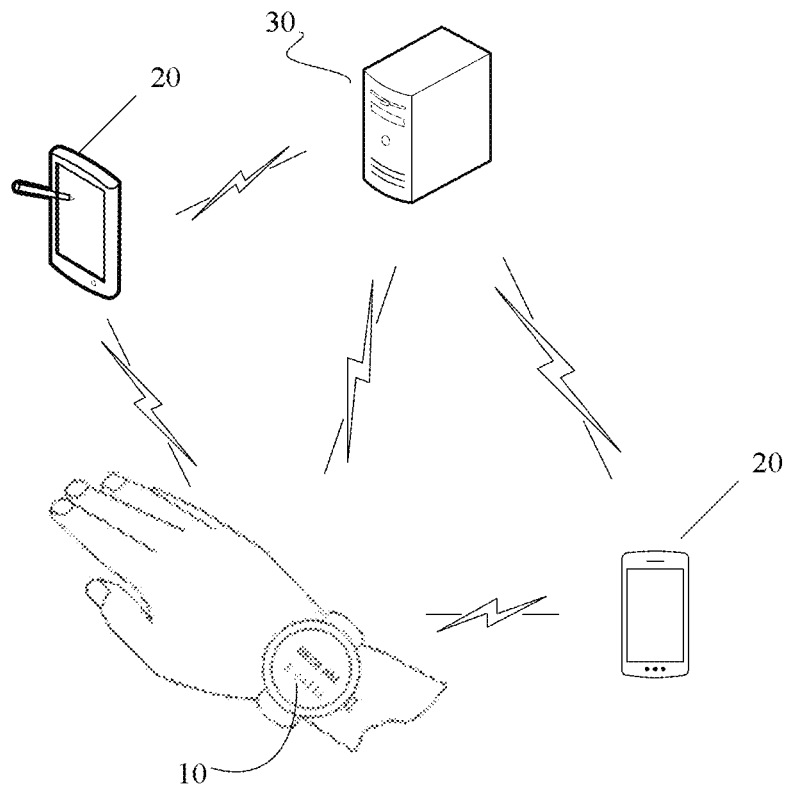
FIG. 12 is a schematic structural diagram of an information processing system according to an embodiment of the present invention.

As shown in FIG. 12, based on the information processing method provided in the foregoing embodiment, an embodiment of the present invention provides an information processing system. The system includes a first terminal 10, a server 30, and a second terminal 20. The first terminal 10 is configured to obtain query information input by a user, and send the query information to the server 30. The server 30 is configured to: receive the query information sent by the first terminal 10; determine whether reply information related to the query information can be obtained; and if determining that the reply information related to the query information cannot be obtained, send the query information to the second terminal 20 corresponding to the first terminal 10. The second terminal 20 is configured to receive the query information sent by the server 30, obtain the reply information that is related to the query information and that is input by the user, and send the reply information to the server 30. The server 30 is further configured to receive the reply information that is related to the query information and that is sent by the second terminal 20, and send the reply information to the first terminal 10. The first terminal 10 is further configured to receive the reply information sent by the server 30.

An embodiment of the present invention provides a computer storage medium, configured to store a computer software instruction used by the first terminal 10. The computer software instruction includes a program configured to execute operations related to the first terminal 10.

It can be understood that, the first terminal 10 in this embodiment of the present invention may be configured to implement all related functions of the first terminal 10 in the foregoing method embodiment. For a specific implementation process, refer to related descriptions of the method embodiment, and details are not further described herein.

An embodiment of the present invention provides a computer storage medium, configured to store a computer software instruction used by the server 30. The computer software instruction includes a program used to execute operations related to the server 30.

It can be understood that, the server 30 in this embodiment of the present invention may be configured to implement all related functions of the server 30 in the foregoing method embodiment. For a specific implementation process, refer to related descriptions of the method embodiment, and details are not further described herein.

An embodiment of the present invention provides a computer storage medium, configured to store a computer software instruction used by the second terminal 20. The computer software instruction includes a program used to execute operations related to the second terminal 20.

It can be understood that, the second terminal 20 in this embodiment of the present invention may be configured to implement all related functions of the second terminal 20 in the foregoing method embodiment. For a specific implementation process, refer to related descriptions of the method embodiment, and details are not further described herein.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that, computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of the another programmable data processing device generate an apparatus for implementing a specified function in one or more processes in the flowcharts and/or in one or more blocks in the block diagrams.

These computer program instructions may alternatively be stored in a computer-readable memory that can instruct the computer or another programmable data processing device to work in a specified manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An information processing method comprising:
  obtaining, by a smartwatch, an input comprising voice information;
  determining, by the smartwatch, whether the voice information comprises interrogative keyword;
  determining, by the smartwatch, the voice information is interrogative information in response to determining the voice information comprises interrogative keyword;
  determining, by the smartwatch, whether reply information corresponding to the interrogative information can be obtained from a memory of the smartwatch;
  sending, by the smartwatch, the interrogative information to a server through a wireless network in response to determining that the reply information corresponding to the interrogative information cannot be obtained from the memory of the smartwatch;
  receiving, by the server, the interrogative information through the wireless network;

determining, by the server, whether the reply information corresponding to the interrogative information can be obtained from a database of the server;

sending, by the server, the interrogative information to a smartphone corresponding to the smartwatch in response to determining that the reply information cannot be obtained from the database of the server;

receiving, by the smartphone, the interrogative information sent by the server;

sending, by the smartphone, reply voice information to the server through the wireless network;

sending, by the server, the reply voice information to the smartwatch in response to receiving the reply voice information;

receiving, by the smartwatch, the reply voice information sent by the server; and playing, by the smartwatch, the reply voice information.

2. The method according to claim 1, wherein before sending the interrogative information to the server, the smartwatch performs semantic analysis on the interrogative information.

3. The method according to claim 2, wherein sending the interrogative information to the server comprises sending the interrogative information on which semantic analysis has been performed to the server.

4. The method according to claim 1, wherein determining, by the smartwatch, whether reply information corresponding to the interrogative information can be obtained from a memory of the smartwatch, comprises:

determining whether a semantic meaning of the interrogative information can be recognized;

in response to determining that the semantic meaning of the interrogative information cannot be recognized, determining that the reply information corresponding to the interrogative information cannot be obtained from the memory of the smartwatch; and in response to determining that the semantic meaning of the interrogative information can be recognized, determining, based on the semantic meaning, whether the reply information can be found in the memory of the smartwatch.

5. The method according to claim 1, wherein determining whether the reply information corresponding to the interrogative information can be obtained from the database of the server comprises:

determining whether a semantic meaning of the interrogative information can be recognized; and determining that a semantic meaning of the interrogative information can be recognized, and determining, based on the semantic meaning, whether the reply information corresponding to the interrogative information can be found in the database.

6. The method according to claim 1, wherein the smartphone is determined by the smartwatch through a contact list displayed on a display screen of the smartwatch.

7. An information processing system comprising:

a smartwatch configured to:
obtain input comprising voice information;
determine whether the voice information comprises interrogative keyword;
determine that the voice information is interrogative information in response to determining that the voice information comprises interrogative keyword;
determine whether reply information corresponding to the interrogative information can be obtained from a memory of the smartwatch;
send the interrogative information to a server through a wireless network in response to determining that the reply information corresponding to the interrogative information cannot be obtained from the memory of the smartwatch;

a server connecting to the smartwatch through the wireless network, the server configured to:
receive the interrogative information sent by the smartwatch;
determine whether the reply information corresponding to the interrogative information can be obtained from a database of the server;
send the interrogative information to a smartphone corresponding to the smartwatch in response to determining that the reply information cannot be obtained from the database;

a smartphone connecting to the server through the wireless network, the smartphone configured to:
receive the interrogative information sent by the server, and send reply voice information to the server through the wireless network;

the server is further configured to receive the reply voice information and send it to the smartwatch; and the smartwatch is further configured to receive the reply voice information sent by the server, and play the reply voice information.

8. The information processing system of claim 7, wherein before sending the interrogative information to the server, the smartwatch is configured to perform semantic analysis on the interrogative information.

9. The information processing system of claim 8, wherein the smartwatch is further configured to send the interrogative information on which semantic analysis has been performed to the server.

10. The information processing system of claim 7, wherein the smartwatch is configured to determine whether reply information corresponding to the interrogative information can be obtained from the memory of the smartwatch by being configured to:

determine whether a semantic meaning of the interrogative information can be recognized;

in response to determining that the semantic meaning of the interrogative information cannot be recognized, determine that the reply information corresponding to the interrogative information cannot be obtained from the memory of the smartwatch; and in response to determining that the semantic meaning of the interrogative information can be recognized, determine, based on the semantic meaning, whether the reply information can be found in the memory of the smartwatch.

11. The information processing system of claim 7, wherein the server is configured to determine whether the reply information corresponding to the interrogative information can be obtained from the database of the server by being configured to:

determine whether a semantic meaning of the interrogative information can be recognized; and determine that a semantic meaning of the interrogative information can be recognized, and determining, based on the semantic meaning, whether the reply information corresponding to the interrogative information can be found in the database.

12. The information processing system of claim 7, wherein the smartphone is identified by the smartwatch through a contact list displayed on a display screen of the smartwatch.

13. A smartwatch comprising:
a processor; and
a memory storing instructions to be executed in the processor, the instructions configured to cause the processor to:
   obtain input comprising voice information;
   determine whether the voice information comprises interrogative keyword;
   determine that the voice information is interrogative information in response to determining that the voice information comprises interrogative keyword;
   determine whether reply information corresponding to the interrogative information can be obtained from a memory of the smartwatch;
   determine whether a semantic meaning of the interrogative information can be recognized;
   in response to determining that the semantic meaning of the interrogative information cannot be recognized, determine that the reply information corresponding to the interrogative information cannot be obtained from a memory of the smartwatch;
   in response to determining that the semantic meaning of the interrogative information can be recognized, determine, based on the semantic meaning, whether the reply information can be found in the memory of the smartwatch;
   send the interrogative information to a server through a wireless network in response to determining that the reply information corresponding to the interrogative information cannot be obtained from the memory of the smartwatch; and
   receive reply voice information sent by the server, and play the reply voice information, wherein the reply voice information comprises information from a smartphone connecting to the server through the wireless network.

14. The smartwatch of claim 13, wherein before sending the interrogative information to the server, the instructions cause the processor to perform semantic analysis on the interrogative information.

15. The smartwatch of claim 14, wherein the instructions are further configured to cause the processor to send the interrogative information on which semantic analysis has been performed to the server.

16. The smartwatch of claim 13, wherein the instructions are further configured to cause the processor to identify the smartphone through a contact list displayed on a display screen of the smartwatch.

* * * * *